US012123995B1

(12) United States Patent
Cao et al.

(10) Patent No.: US 12,123,995 B1
(45) Date of Patent: Oct. 22, 2024

(54) INTELLIGENT MONITORING AND EARLY WARNING DEVICE AND METHOD FOR ROCK BURST BASED ON MULTI-FIELD AND MULTI-SOURCE INFORMATION FUSION

(71) Applicants: China University of Mining and Technology, Xuzhou (CN); Xuzhou Hongyi Technology Development Co., Ltd., Xuzhou (CN)

(72) Inventors: Anye Cao, Xuzhou (CN); Yaoqi Liu, Yulin (CN); Xu Yang, Xuzhou (CN); Qing Ge, Xuzhou (CN); Linming Dou, Xuzhou (CN); Siyuan Gong, Xuzhou (CN); Zhifeng Ma, Xuzhou (CN); Wu Cai, Xuzhou (CN); Qiang Niu, Xuzhou (CN); Changbin Wang, Xuzhou (CN)

(73) Assignees: China University of Mining and Technology, Xuzhou (CN); Xuzhou Hongyi Technology Development Co., Ltd., Xuzhou (CN)

( * ) Notice: Subject to any disclaimer, the term of this patent is extended or adjusted under 35 U.S.C. 154(b) by 0 days.

(21) Appl. No.: 18/414,724

(22) Filed: Jan. 17, 2024

(30) Foreign Application Priority Data

May 16, 2023 (CN) .......................... 202310553720.X

(51) Int. Cl.
*G01V 1/30* (2006.01)
*G01V 1/18* (2006.01)
(Continued)

(52) U.S. Cl.
CPC ................ *G01V 1/30* (2013.01); *G01V 1/181* (2013.01); *G01V 1/282* (2013.01); *G01V 1/288* (2013.01); *G01V 1/345* (2013.01); *G01V 2210/66* (2013.01)

(58) Field of Classification Search
CPC .... G01V 1/288; G01V 1/30; G01V 2210/123; G01V 2210/646; G01V 1/003;
(Continued)

(56) References Cited

U.S. PATENT DOCUMENTS

2020/0033496 A1* 1/2020 Li ........................ G01N 27/725
2020/0116882 A1* 4/2020 Zheng ..................... G06N 3/088
(Continued)

FOREIGN PATENT DOCUMENTS

CN 105257339 A * 1/2016
CN 109653800 A * 4/2019 .............. E21F 17/18
(Continued)

*Primary Examiner* — Yoshihisa Ishizuka
*Assistant Examiner* — Carter W Ferrell
(74) *Attorney, Agent, or Firm* — Hemisphere Law, PLLC; Zhigang Ma

(57) ABSTRACT

An online stress monitoring system is used to obtain a stress distribution of each position, a geophone monitoring system is used to monitor high-frequency vibration signals produced by coal and rock fracture, a support resistance monitoring system is used to monitor working resistance of hydraulic supports in a working face, a well-ground joint microseismic system is used to monitor low-frequency vibration signals produced by the coal and rock fracture, and realize position of a microseismic source and inversion imaging of mining fractures, and an anchor stress monitoring system is used to monitor stress states of anchor bolts and cables. A data processing center is used to comprehensively process data obtained from the above five systems using an early warning model, thereby to obtain a prediction result of rock burst and determine whether to make early warning, thus workers can take timely measures according to the early warning situation.

10 Claims, 12 Drawing Sheets

(51) Int. Cl.
*G01V 1/28* (2006.01)
*G01V 1/34* (2006.01)

(58) Field of Classification Search
CPC ...... G01V 1/01; G01V 1/306; G01V 2210/00; G01V 2210/10; G01V 2210/65; G01V 1/282; G01V 1/50; G01V 1/181; G01V 1/345; G01V 2210/66; G01V 1/48; G01V 1/36; E21F 17/185; G06F 30/20; E21C 41/18; E21C 39/00; E21C 41/00; E21D 20/003; G01L 1/255
See application file for complete search history.

(56) References Cited

U.S. PATENT DOCUMENTS

2021/0134135 A1* 5/2021 He ................. G08B 31/00
2023/0324574 A1* 10/2023 Li ................. G01V 1/288
702/14

FOREIGN PATENT DOCUMENTS

CN 115407396 A * 11/2022
WO WO-2019211475 A1 * 11/2019 ........... E21D 21/008

* cited by examiner

INTELLIGENT MONITORING AND EARLY WARNING DEVICE AND METHOD FOR ROCK BURST BASED ON MULTI-FIELD AND MULTI-SOURCE INFORMATION FUSION

TECHNICAL FIELD

The disclosure relates to the technical field of mine rock burst prevention and control, and more particularly to an intelligent monitoring and early warning device and method for rock burst based on multi-field and multi-source information fusion.

BACKGROUND

In China, underground projects such as tunnel excavation, mining and nuclear waste storage are gradually transferred to deep strata, and rock dynamic disasters such as coal bump, rock burst, and mining tremor occur frequently, which seriously threaten the safe development and utilization of deep resources and space. Especially in the process of deep coal mining, rock burst accidents occur frequently, which leads to major safety risks, serious losses and painful lessons. At present, there are 146 rock burst mines in China, which are distributed in Shandong, Shaanxi, Inner Mongolia and Xinjiang. Since 2018, the rock burst has shown unprecedented frequency, intensity and complexity. For example, in 2018, the "10.20" rock burst accident in Longdong, Shandong Province, killed 21 people; In 2019, the "6.9" rock burst accident in Longjiabao, Jilin Province, killed 9 people and injured 12 others; In 2020, the "2.22" rock burst accident in Longdong, Shandong Province, killed four people; In 2021, the "10.11" rock burst accident in Hujiahe, Shaanxi Province killed four people and seriously injured six others. Therefore, the monitoring, early warning, prevention and control of the rock burst in China will face great pressure in the future.

With the increase of the national scientific and technological strength and the intelligent construction of coal mines, "mechanized substitution of people and automatic reduction of people" has become the common understanding of the transformation of old and new kinetic energy and high-quality development of enterprises. Intelligent mining has become an important means of safe mining of deep resources and an important development direction to effectively curb the rock burst. A microseismic monitoring method is a method with the largest monitoring range and the most information in current coal mining processes. Almost all the rock burst mines in China have installed this kind of monitoring system, which has become the most important means of regional monitoring and early warning of the rock burst in coal mines. At present, the analysis and processing of microseismic monitoring data is still in its infancy, which is difficult to adapt to increasingly complex mining conditions on site. It is embodied in a layout method of microseismic system networks, a positioning method of microseismic events and a real-time inversion and imaging of microseismic source rupture parameters under deep complex mining conditions, which are far from the intelligent, real-time and unmanned construction goals. In addition, a stress monitoring system, a geoacoustic monitoring system and a support resistance monitoring system are also installed in the coal mines, but at present, a large amount of monitoring information generated by such monitoring systems has not been effectively utilized and processed, so it is difficult to realize joint monitoring and analysis of a stress distribution in tunnels (i.e., roadways) and an internal fracture of a coal and rock mass affected by stress, and ultimately it is impossible to realize efficient and accurate monitoring and early warning of the rock burst in the coal mines.

To sum up, the intelligent monitoring and early warning of the rock burst faces three major challenges. Firstly, how to carry out accurate microseismic monitoring according to the optimization of a whole process of a well-ground joint microseismic system from a layout of geophones, waveform acquisition to data processing; Secondly, how to realize joint monitoring of the stress distribution in tunnels and the internal fracture of the coal and rock mass affected by stress; Thirdly, how to integrate the monitoring data such as microseismic monitoring data, online stress monitoring data, geoacoustic monitoring data and support resistance monitoring data, so as to truly realize the intelligent monitoring and early warning of the rock burst and provide support and guarantee for targeted and accurate prevention and control of the rock burst.

SUMMARY

In view of the problems existing in the prior art, the disclosure provides an intelligent monitoring and early warning device and method for rock burst based on multi-field and multi-source information fusion, which can respectively optimize microseismic monitoring data, stress distribution monitoring data and monitoring data of the internal fracture of the coal and rock mass affected by stress, and integrate the microseismic monitoring data, the online stress monitoring data, the geoacoustic monitoring data and the support resistance monitoring data for comprehensive early warning, so as to truly realize intelligent monitoring and early warning for the rock burst and provide support and guarantee for targeted and accurate prevention and control of the rock burst.

In order to achieve the above objective, technical solutions of the disclosure are as follows.

An intelligent monitoring and early warning device for rock burst based on multi-field and multi-source information fusion, includes: an online stress monitoring system, a geoacoustic monitoring system, a support resistance monitoring system, a well-ground joint microseismic system, anchor stress monitoring systems and a data processing center.

The online stress monitoring system includes: multiple stress sensors, the stress sensors are arranged in groups of two, multiple groups of stress sensors are arranged at equal intervals along a driving direction (i.e., a tunneling direction or an excavating direction) of a working face and disposed on mining slopes of two sides roadways of the working face, and the multiple groups of stress sensors are configured to obtain stress distributions of positions and feed them back to the data processing center.

The geoacoustic monitoring system includes: a ground center and multiple geoacoustic monitoring probes, the ground center is arranged on the ground, the geoacoustic monitoring probes are distributed on a mining face and a driving face underground for monitoring high-frequency vibration signals generated by the internal fracture of the coal and rock mass, and each geoacoustic monitoring probe feeds back the monitoring data to the ground center through a wireless data transmitter, and the ground center feeds back the monitoring data to the data processing center.

The support resistance monitoring system includes: a ground data processing device and multiple pressure self-recording instruments, the ground data processing device is arranged on the ground, and the pressure self-recording instruments are respectively installed on pillars of hydraulic supports in the mining face to monitor support pressures of the pillars and feed them back to the ground data processing device; and the ground data processing device takes an average support pressure of each hydraulic support as the support resistance of the hydraulic support.

The well-ground joint microseismic system includes: ground devices and underground devices, and the ground devices are arranged on the ground of the mine and the underground devices are installed in the mine.

The ground devices include: a monitoring host and multiple ground stations, the ground stations are in data communication with the monitoring host and are used to receive control instructions sent by the monitoring host and collect data, and feed back the collected data to the monitoring host.

The underground devices include: multiple geophones (i.e., seismic pickup sensors), and the geophones are disposed on positions of the mine. Each geophone is connected with the monitoring host through a cable and configured to feed back collected waveform data to the monitoring host. The monitoring host is configured to analyze and process the data fed back by each ground station and each geophone, perform the positioning of the microseismic source and the inversion imaging of mining fractures to obtain an imaging result, and feed back the imaging result to the data processing center.

Each anchor stress monitoring system includes: a yield supporting tube, multiple RFID tags and a shielding iron box, the yield supporting tube is sleeved on a rod body (i.e., a body of the anchor bolt or cable) outside the coal and rock mass and is tightly fixed between a tray and a spherical nut, the RFID tags are installed at the lower part of the yield supporting tube, the shielding iron box and the spherical nut are connected through a connecting rod, the shielding iron box is disposed below the multiple RFID tags, and the top of the shielding iron box defines an opening. During normal monitoring, the RFID tags can communicate with one another. When the yield supporting tube is pressed and deformed, one of the RFID tags enters the shielding iron box through the opening, at this time, the shielding iron box shields the communication of this RFID tag. According to the deformation of the yield supporting tube, the RFID tags can be controlled to enter the shielding iron box in turn, and a stress cloud map is generated and fed back to the data processing center.

The data processing center summarizes the obtained monitoring data, and then comprehensively analyzes and processes the data by adopting an early warning model, so as to give early warning of the rock burst.

In an embodiment, the geophones are distributed on horizontal alleys in the mine, the district rises in the mining area and the air inlet and air return alleys in the coal mining face. The geophones include: a single-component geophone and/or a three-component geophone. Through the mixed use of various geophones, the geophones can better obtain the required microseismic monitoring data.

In an embodiment, a compressive strength of the yield supporting tube is 30-50 MPa, which can ensure the required compressive strength of the yield supporting tube. The number of the RFID tags is three, which can meet the monitoring needs and save the installation cost, and each RFID tag is flexibly connected with the yield supporting tube, so as to prevent the RFID tag from being affected when the yield supporting tube is deformed.

A working method of the above intelligent monitoring and early warning device for rock burst based on multi-field and multi-source information fusion of microseismic monitoring includes the following steps 1 to 6.

In the step 1, monitoring of the online stress monitoring system: after the online stress monitoring system is installed, each stress sensor collects stress distribution data of each position in real time during driving and mining of the working face, and feeds back the stress distribution data to the data processing center.

In the step 2, monitoring and early warning of the geoacoustic monitoring system: after the geoacoustic monitoring system is installed, multiple geoacoustic monitoring probes monitor high-frequency vibration signals generated by the internal fracture of the coal and rock mass at the positions during the driving and mining of the working face, and feed back the monitoring data (i.e., high-frequency vibration signals) to the data processing center through wireless data transmitters.

In the step 3, monitoring and early warning of the support resistance monitoring system: after the support resistance monitoring system is installed, roof pressures in different areas of the working face are monitored by monitoring the support resistance of multiple hydraulic supports during the mining of the working face, and the ground data processing device feeds back the monitoring data (i.e., roof pressures) to the data processing center through a wireless data transmitter.

In the step 4, monitoring of the well-ground joint microseismic system, includes S1 to S4.

S1, according to an area to be monitored, an overall cooperative global optimal layout scheme of the ground stations and the geophones is established, and the ground stations and the geophones are arranged and installed according to the overall cooperative global optimal layout scheme.

S2, a microseismic signal denoising model based on deep neural network is constructed, seismic data collected from the geophones is denoised to obtain denoised seismic data, an automatic first arrival identification model for microseismic signals in a coal mine is constructed, the monitoring host uses the automatic first arrival identification model to extract the denoised seismic data fed back by the geophones, thus obtaining the microseismic signals.

S3, according to the microseismic signals obtained in the S2 and the monitoring data obtained from the ground stations, the well-ground joint positioning is carried out, so as to obtain positions of the microseismic source.

S4, according to the positions of the microseismic source obtained in the S3 and the microseismic signals obtained in the S2, a real-time inversion model of microseismic source rupture parameters is constructed, and the microseismic source rupture parameters are obtained after inversion according to the real-time inversion model; and mining fracture imaging is formed according to the rupture parameters of the microseismic source to obtain an imaging result, and the imaging result is fed back to the data processing center.

In the step 5, monitoring of the anchor stress monitoring system: after the anchor stress monitoring system is installed on each anchor bolt and cable to be monitored, the RFID tags are used to monitor the stress state of each anchor bolt and cable in the roadway and thereby to generate stress nephogram, and the stress nephogram is fed back to the data processing center.

In the step 6, an initial early warning model is constructed and trained to obtain an early warning model. Then, the monitoring data received by the data processing center in the above five steps are input into the early warning model. After comprehensive analysis of the early warning model, a prediction result of the rock burst is output to determine whether to carry out early warning, and the worker takes corresponding measures in time according to the prediction result to reduce the impact of the rock burst on the coal mine.

In an embodiment, specific processes for establishing the overall cooperative global optimal layout scheme of the ground stations and the geophones in the S1 include: S11 to S14.

S11, based on a mining geophysical method, a theoretical model describing a process from start to end of mining-induced microseismic source ruptures is constructed; and a corresponding relationship between a microseismic energy and a signal main frequency and a corresponding relationship between the microseismic energy and a maximum amplitude are determined according to action mechanisms of different fracture scales and constitutive models in the coal and rock mass on microseismic source frequency changes and waveform amplitude changes.

S12, numerical simulation is used to study propagation and attenuation law of the microseismic signals with different main frequencies and maximum amplitudes in the surrounding rock of the roadway, to determine an effective monitoring range of microseismic signals with different energy levels under conventional environmental background noise, to establish a full-frequency signal acquisition scheme for the microseismic signals with different energy levels, and to obtain geophone types and effective installation ranges suitable for monitoring microseismic signals with different energy ranges (i.e., the microseismic signals with different energy levels).

S13, the adopted geophones include the single-component geophones and the three-component geophones. Firstly, a travel-time objective function t for positioning is constructed. By introducing a directional objective function d and combining the travel-time objective function t, a mixed objective function is constructed, which can reduce the arrival identification accuracy and the influence of network layout factors, and improve the solution accuracy of microseismic source parameters under unfavorable monitoring conditions. At this time, there is a high requirement for the spatial coverage of the microseismic monitoring network composed of the geophones. However, at present, the geophones cannot form a complete spatial coverage of the coal and rock mass in various monitoring scenes underground, resulting in the microseismic system being unable to accurately solve the positions and parameters of the microseismic source. In order to break through this limitation, a certain number of three-component geophones are used to monitor the propagation direction of microseismic vibration waves. Then, because the travel-time objective function t and the directional objective function d are closely related to the propagation path, a positioning objective function for three-dimensional wave velocity distributions under the curved ray path of the single-headed tunneling roadway is constructed to obtain a propagation path and an angle closer to the actual microseismic signal in the roadway, so as to further eliminate the influence of wave velocity, ray propagation path and network layout on the microseismic positioning accuracy.

S14, production and construction processes, methods and environments of the rock burst in the mine are collected, and monitoring conditions of different working environments at different production stages are classified and analyzed, such as single-head monitoring, joint monitoring of the working face and a driving head, and joint monitoring between driving heads. According to different monitoring situations, a corresponding optimal geophone installation mode and reasonable installation parameters are determined, and a quantitative formula describing the difficulty of installation is constructed. According to the basic principle of underground geophone layouts, considering the geophone types, spatial layouts and monitoring frequency bands, an optimal scheme of the underground geophone layouts under different geological structure conditions and different roadway conditions is constructed. Then, the virtual arrival technology is used to simulate the arrival time of microseismic waveforms, and a multi-objective function is constructed to maximize the perception of tunneling microseismic signals, accurately solve the microseismic source parameters and minimize the installation cost. Combined with the actual construction technology on site, a multi-objective function solution model based on particle swarm optimization algorithm is constructed, so as to finally determine the optimal spatial distribution of the geophones, including the numbers, types and positions of the geophones, and to establish the overall cooperative global optimal layout scheme of the ground stations and the geophones.

In an embodiment, specific processes for constructing the microseismic signal denoising model based on deep neural network in the S2 are as follows: an initial microseismic signal denoising model is constructed and includes three parts: frequency domain feature extraction, coding and decoding. The specific progresses for constructing the initial microseismic signal denoising model include: performing short-time Fourier transform (STFT) on an input microseismic signal to obtain a time-frequency feature; performing standardization on the time-frequency feature to obtain a standardized time-frequency feature, inputting the standardized time-frequency feature into an encoder for down-sampling, and obtaining a high-dimensional feature map through multiple down-sampling; and decoding the high-dimensional feature map through multiple up-sampling to obtain a mask m with a same size as the standardized time-frequency feature.

In the initial microseismic signal denoising model, input signals are the input microseismic signals R(t) detected by the geophones, the time-frequency feature R(f,t) is obtained by the STFT of the input microseismic signals R(t), the STFT uses a time window with a length of 100 ms, and a progress for obtaining the time-frequency feature R(f,t) is expressed as follows:

$$R(f,t)=\text{STFT}[R(t)].$$

The time-frequency feature R(f,t) includes: a microseismic signal M(f,t) and noise N(f,t), and the time-frequency feature R(f,t) is expressed as follows:

$$R(f,t)=M(f,t)+N(f,t).$$

A training goal of the initial microseismic signal denoising model is to minimize an error between a predicted signal and a real signal, and a loss function is expressed as follows:

$$L(m,\hat{m})=\log(1+e^{-m\cdot\hat{m}}).$$

A generation method of the mask m is as follows:

$$m=\left[1+\left|\frac{N(f,t)}{M(f,t)}\right|\right]^{-1}.$$

The initial microseismic signal denoising model uses single-component microseismic waveforms of multiple coal mines for training to obtain the microseismic signal denoising model.

In an embodiment, specific progresses for constructing the automatic first arrival identification model in the S2 are as follows: based on a microseismic signal time-frequency conversion method of short-time Fourier transform, a microseismic spectrum map is constructed by taking advantages of richer information of the microseismic signals in a frequency domain, and microseismic signal features are extracted from a time domain and the frequency domain; according to an implicit feature extraction method of microseismic data based on depth residual network and an explicit feature extraction method based on statistical method, a feature fusion method of complex microseismic data based on attention mechanism is constructed, so as to realize multi-level and multi-scale feature extraction; and the automatic first arrival identification model for the microseismic signals in the coal mine is constructed. The methods used in these steps are all well-known algorithms or methods in the related art.

In an embodiment, specific progresses for the well-ground joint positioning in the S3 include: S31 to S34.

S31, the microseismic signals with low signal-to-noise ratio (SNR) and the monitoring data obtained from the ground stations are collected, and position information of each geophone and each ground station is determined. For microseismic source positioning in a horizontal direction, arrival time of a P wave of the microseismic signals received by each geophone and each ground station is obtained, and a formula is as follows:

$$t_i - t_0 = \frac{\sqrt{(x_0 - x_i)^2 + (y_0 - y_i)^2 + (z_0 - z_i)^2}}{v(x_0, y_0, z_0)}.$$

In the above formula, $x_0$, $y_0$, $z_0$ represents coordinates of the microseismic source; $t_0$ represents origin time of the microseismic source; $x_i$, $y_i$, $z_i$ represents coordinates of an i-th geophone or ground station; $t_i$ represents the arrival time of the P wave at the i-th geophone or ground station; and $v(x_0, y_0, z_0)$ represents a propagation velocity of the P wave.

There are four unknowns ($x_0$, $y_0$, $z_0$, $t_0$) in the above formula, to solve this formula, data from at least four geophones or ground stations are needed. At present, microseismic systems put into use in various mining areas are arranged in the form of 16 ground stations, so 16 formulas similar to the above formula can be listed, and the microseismic source positioning is to find a minimum value of the above formula, and the above formula is written as follows:

$$F(x_0, y_0, z_0, t_0) = \sum_{i=1}^{n} w_i \left| t_i - t_0 - \frac{\sqrt{(x_0 - x_i)^2 + (y_0 - y_i)^2 + (z_0 - z_i)^2}}{v(x_0, y_0, z_0)} \right|^p.$$

In the above formula, $w_i$ represents a weight function of an observation value of the i-th geophone or ground station; n represents a number of geophones and ground stations marked by the P wave; and p represents a parameter with a value of 1 or 2.

The position information of the microseismic source in the horizontal direction is obtained by using the above formula for calculation.

S32, for microseismic source positioning in a vertical direction, a roadway level of a blasting position is determined by obtaining a mining engineering plan of the working face, and whether a type of the microseismic source is coal seam blasting or roof blasting is determined by using a blasting construction account provided by a mining team. A vertical position (i.e., z value) of the blasting position is equal to the roadway level (i.e., the level of the roadway where the blasting position is located) when the type of the microseismic source is the coal seam blasting; or a vertical position (i.e., z value) of the blasting position is equal to the roadway level plus a height of explosives shown in a layout plan for blasting and roof breaking construction when the type of the microseismic source is the roof blasting.

S33, according to an influence of a distribution density and a height of underground strata, an initial wave velocity model is constructed. In practical engineering, the rock mass in the microseismic monitoring area is not uniform, and stress wave velocities in different areas are different. Therefore, the stress wave ray propagates according to the minimum travel time path, not the geometrically shortest path. In the microseismic monitoring of layered coal mines, the propagation of stress waves of the microseismic source to the ground stations in the mining area is more complicated than the propagation of stress waves of the microseismic source to the rock mass medium of the underground roadway, which leads to the great change of the P wave velocity in the vertical direction. Therefore, a geological situation of the working face is determined according to drilling data of the working face, and the strata is layered according to their thickness. According to their different lithologies and propagation velocities, an initial propagation velocity is determined, and a three-dimensional layered velocity model is constructed by Python. A first layer interface of the three-dimensional layered velocity model is a ground surface, and a velocity in the three-dimensional layered velocity model gradually increases from top to bottom, the three-dimensional layered velocity model is divided to three velocity layers according to similar velocity distributions, the three velocity layers are respectively numbered as ①, ② and ③ from bottom to top, and velocity values of the three velocity layers are denoted as V1, V2 and V3 respectively. An upper boundary of each divided velocity layer is divided into grids to determine a propagation path of seismic waves of microseismic events in a shortest time principle, and a Powell optimization algorithm is used to optimize the wave velocity of each velocity layer, and the most reasonable initial wave velocity model is obtained.

S34, after the initial wave velocity model is constructed, for a new non-positioned microseismic event, firstly, a horizontal positioning result of an existing microseismic monitoring system in the mine is taken as an initial positioning point of the microseismic source, because the geophones of the microseismic monitoring system have good horizontal envelopment in the underground, there are a large number of ground stations and high positioning accuracy, which can be regarded as the real position of microseismic event. Then the edge grid search and position is carried out on 100 points (an interval between two adjacent points is 1 m) above and below the initial positioning point of the microseismic source by using waveform signals received by the ground stations and the initial wave velocity model, and a point with a smallest time residual is taken as a final positioning point of the microseismic source. A positioning formula is as follows:

$$f = \Sigma_{i,j=1}{}^m \xi_{i,j} = \Sigma_{i,j=1}{}^m [t_i - t_j - (\Delta t_i - \Delta t_j)]^2.$$

In the above formula, $t_i$ and $t_j$ represent arrival time of microseismic signals received by different ground stations (i.e., the i-th ground station and the j-th ground station); and $\Delta t_i$ and $\Delta t_j$ represent propagation time calculated by points searched by the edge grid search and position according to a propagation path of the initial wave velocity model.

In an embodiment, the S4 includes S41 to S43.

S41, the microseismic signals (i.e., microseismic waveforms induced during mining of typical rock burst working face) obtained in the S2 are taken as basic data, a mixed moment tensor method is used to solve a focal mechanism of microseismic events to obtain moment tensors. The moment tensors are decomposed to obtain parameters of fracture surfaces of the microseismic source, and the parameters may include fracture types, azimuth angles, inclination angles, etc. Due to a limitation of a symmetry of moment tensor focal models, two sets of parameters in the inverse moment tensor solution meet the requirements, that is, there are two fracture surfaces but there is only one real fracture surface, thus the real fracture surface is determined for subsequent analysis. When determining the real fracture surface, mechanical geometric equations of stress tensors, normal components and slip components of fracture surface microelements are constructed according to a microseismic source theory and a Griffith strength theory of fracture surface slip instability, an optimal function equation set for stress tensor solution is constructed by combining multiple positions of the microseismic source obtained in the S3, the optimal function equation set is solved by using particle swarm optimization to obtain a normalized proportional relationship of stress tensors of fracture surfaces, a principal stress difference ratio is solved according to the normalized proportional relationship, and fracture possibility indexes of two fracture surfaces are calculated. Because a fracture is more likely to occur along the real fracture surface under same stress conditions, the fracture surface with a larger fracture possibility index is determined as the real fracture surface, a data set of the fracture mechanism of the microseismic source in the mine is established according to the determined parameters of the real fracture surface and the positions of the microseismic source. The data set includes: the positions, waveforms and focal mechanisms (fracture types, focal radius, azimuth and inclination angles) of the microseismic source.

S42, aiming at a complexity of identifying the focal mechanism of the microseismic source, the real-time inversion model of the microseismic focal rupture parameters is constructed based on migration learning. The real-time inversion model is trained by using the data set of the fracture mechanism of the microseismic source in the mine obtained in the S41 to obtain a trained real-time inversion model. The trained real-time inversion model is updated according to data collected by different coal mines to obtain an updated real-time inversion model. An output layer of the real-time inversion model (i.e., model output layer) is iteratively updated on the premise of fixing a common feature network layer to improve inversion models for different coal mines. Finally, original microseismic data is input to the updated real-time inversion model, and the updated real-time inversion model outputs the microseismic source rupture parameters. The microseismic source rupture parameters include: the fracture types, the focal radius, the azimuth and inclination angles.

S43, after the real fracture surface and the microseismic source rupture parameters (the fracture types, the focal radius, the azimuth and inclination angles) are obtained, combined with a spatialization of microseismic sources, fracture surfaces induced by microseisms in space are imaged according to a spatial relationship of fracture surfaces. Under the same stress conditions, crack propagation meets principles of shortest path, one-way propagation and no repeated penetration, a breadth-first search (BFS) method in graph theory is used to determine penetration cracks between multiple intersecting fracture surfaces and generate a fracture network. A high-simulation geological model is constructed and combined with the fracture network, and density and evolution trend of fracture development are directly projected into the three-dimensional space by using a fracture density mapping method and a time-space distance mapping method, so as to realize real-time imaging of mining fractures combined with rock structures and focal mechanisms, which provides a basis for studying the development law of mining fractures, the migration characteristics of stope rock structures, and the prediction and early warning of rock burst or strong mine earthquake.

In an embodiment, specific progresses for using RFID tags to monitor the stress states of the anchor bolts and cables in the roadway and generating the stress nephogram in the step 5 are as follows.

I: three thresholds are determined according to a relationship between deformations and stress values of a yield supporting tube before monitoring. That is, a stress value corresponding to a deformation of the yield supporting tube when the first RFID tag falls into a shielding iron box is 65% of an anchoring force of the anchor bolt and cable, a stress value corresponding to a deformation of the yield supporting tube when the second RFID tag falls into the shielding iron box is 75% of the anchoring force of the anchor bolt and cable, and a stress value corresponding to a deformation of the yield supporting tube when the third RFID tag falls into the shielding iron box is 85% of the anchoring force of the anchor bolt and cable.

II: a worker on duty every day patrols the roadway with a RFID reader when beginning to monitor the stress states of the anchor bolts and cables. The stress states of the anchor bolts and cables are determined by detecting whether the RFID reader fails, and stress state levels of the anchor bolts and cables are recorded. The specific progresses for determining the stress states of the anchor bolts and cables by detecting whether the RFID reader fails are as follows: for each anchor bolt and cable, a stress state level of the anchor bolt and cable is determined to be a normal stress state when three RFID tags are detected; or a stress state level of the anchor bolt and cable is determined to be a low-risk stress state when two RFID tags are detected; or a stress state level of the anchor bolt and cable is determined to be a medium-risk stress state when one RFID tag is detected; or a stress state level of the anchor bolt and cable is determined to be a high-risk stress state when no RFID tag is detect.

III: the recorded stress state levels of the anchor bolts and cables are arranged after daily inspection by the worker on duty. The stress nephogram of a surrounding rock of the roadway is drawn according to the recorded stress state levels of the anchor bolts and cables, and the stress nephogram is updated after the daily inspection, thereby to obtain a change of stress distribution of the surrounding rock of the roadway and obtain latest stress nephogram of the surrounding rock of the roadway in time. The latest stress nephogram of the surrounding rock of the roadway as fifth monitoring data is fed back to the data processing center.

In an embodiment, specific progresses for the step 6 are as follows: the initial early warning model is constructed based on massive historical data of a rock burst cloud platform, and then energy grade labels are generated according to massive historical data of mines, expert knowledge and historical experience to obtain a data set corresponding to input and output of the initial early warning model. The initial early warning model is trained with the data set to obtain the trained early warning model, and then the first to fifth monitoring data obtained from the step 1 to step 5 is used as input data of the early warning model. The early warning model maps different input data to the same feature space according to its dimension by convolution and cyclic neural network, and then uses a self-attention mechanism to realize a weighted fusion of various features, so as to obtain fusion features that can represent a current state of the coal and rock mass in a framework, and then input the fusion features into a fully connected network for normalization. After the normalization, the prediction result of the rock burst is obtained, the prediction result of the rock burst is no risk, weak risk, moderate risk or strong risk, and the early warning is carried out according to the prediction result.

In an embodiment, 80% data in the data set is used to train the initial early warning model, 10% data in the data set is used for verification, and the remaining 10% data in the data set is used to evaluate a training effect of the constructed early warning model. In an actual early warning process, newly added data continues to increase with the passage of time, and at least 30% of the data in the above data set is randomly selected to form a new small data set with the newly added data. The early warning model is fine-tuned and updated with the new small data set by adopting the same method as the above training, thereby to adapt to small changes of spatial structure features and geological factors of the coal and rock mass.

Compared with the prior art, the disclosure adopts the mode of combining an online stress monitoring system, a geoacoustic monitoring system, a well-ground joint microseismic system, a support resistance monitoring system and an anchor stress monitoring system. The online stress monitoring system is used to acquire a stress distribution of each position and feed back the stress distribution to a data processing center. The geoacoustic monitoring system is used to monitor high-frequency vibration signals generated by an internal fracture of a coal and rock mass, and feed back monitoring data (i.e., the high-frequency vibration signals) to the data processing center. The well-ground joint microseismic system is used to collect low-frequency vibration signals in a mine, then analyze and process data fed back by various ground stations and geophones to realize the positioning of the microseismic source and inversion imaging of mining fractures, and feed back the imaging result to the data processing center. The support resistance monitoring system is used to monitor roof pressures in different areas of a working face by monitoring support resistances of multiple hydraulic supports, and feed back the monitoring data (i.e., roof pressures) to the data processing center. The anchor stress monitoring system is used to use RFID tags to monitor a stress state of each anchor bolt and cable in a tunnel and generate a stress nephogram, which is fed back to the data processing center. Finally, the monitoring data collected by the data processing center is comprehensively processed by the constructed early warning model, and a prediction result of rock burst is output and whether to make early warning is determined, so that the worker can take timely measures according to the early warning situation to reduce the impact of rock burst on the mine.

To sum up, the disclosure not only carries out accurate microseismic monitoring on the well-ground joint microseismic system after optimizing the whole process from the layout of the geophones, the waveform acquisition to the data processing, but also monitors the stress distribution in the tunnel through the online stress monitoring system, the support resistance monitoring system and the anchor stress monitoring system, and monitors the internal fracture of the coal and rock mass affected by stress through the geoacoustic monitoring system, so as to realize various monitoring combinations. Moreover, the microseismic monitoring data, the stress distribution monitoring data, the support resistance monitoring data and the monitoring data of the internal fracture of the coal and rock mass affected by stress are integrated and comprehensively analyzed to judge whether to carry out early warning, so as to truly realize the intelligent monitoring and early warning of the rock burst and provide support and guarantee for targeted and accurate prevention and control of the rock burst.

BRIEF DESCRIPTION OF DRAWINGS

in FIG. 7, 1: bolt body, 2: tray, 3: yield supporting tube, 4: ball nut, 5: RFID tag, 6: shielding iron box.

DETAILED DESCRIPTION OF EMBODIMENTS

The disclosure will be further explained below.

Figure 1:
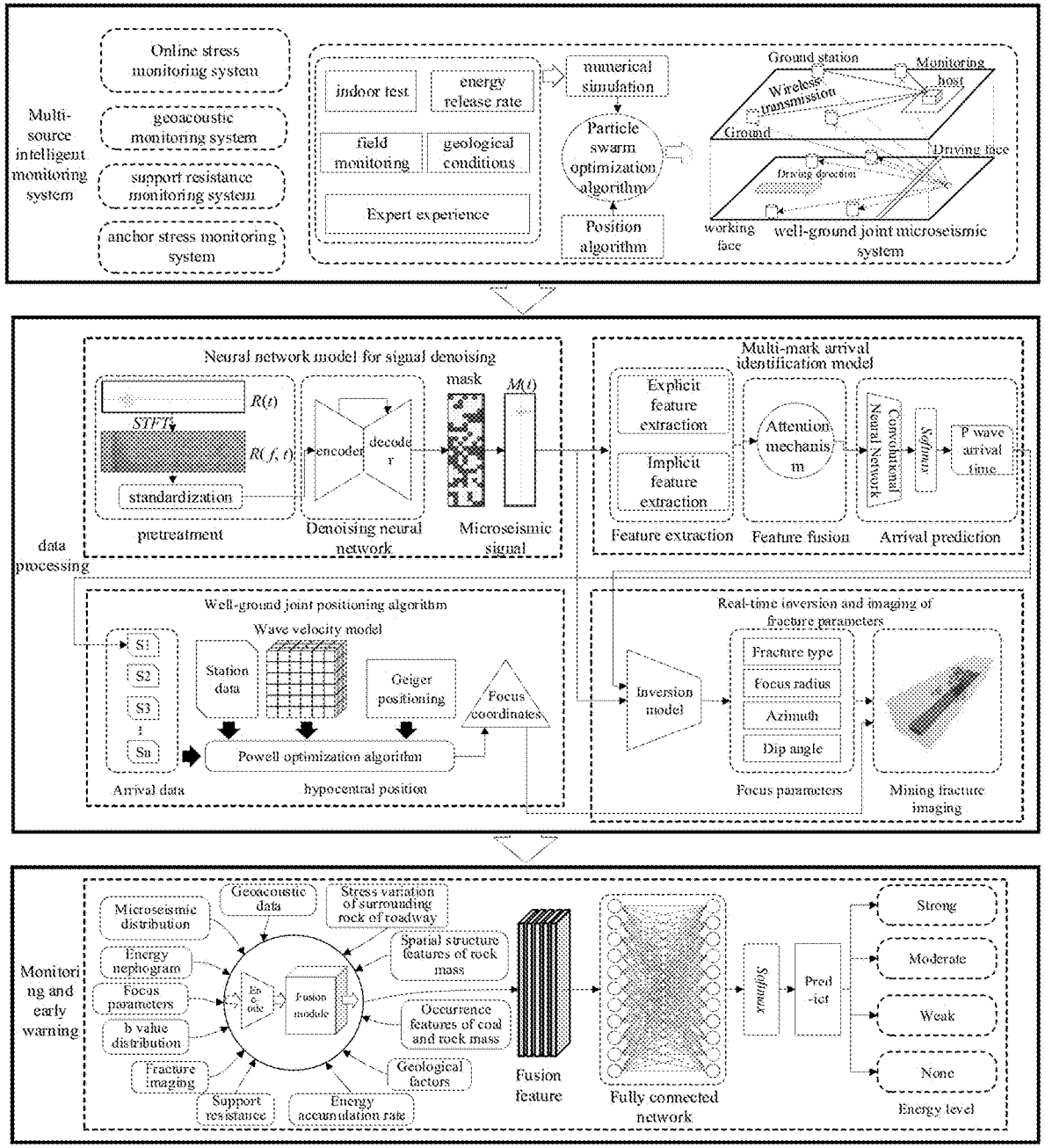
FIG. 1 illustrates a schematic flowchart of a method provided by the disclosure.

As shown in FIG. 1, an intelligent monitoring and early warning device for rock burst based on multi-field and multi-source information fusion includes: an online stress monitoring system, a geoacoustic monitoring system, a support resistance monitoring system, a well-ground joint microseismic system, an anchor stress monitoring system and a data processing center.

Figure 2:
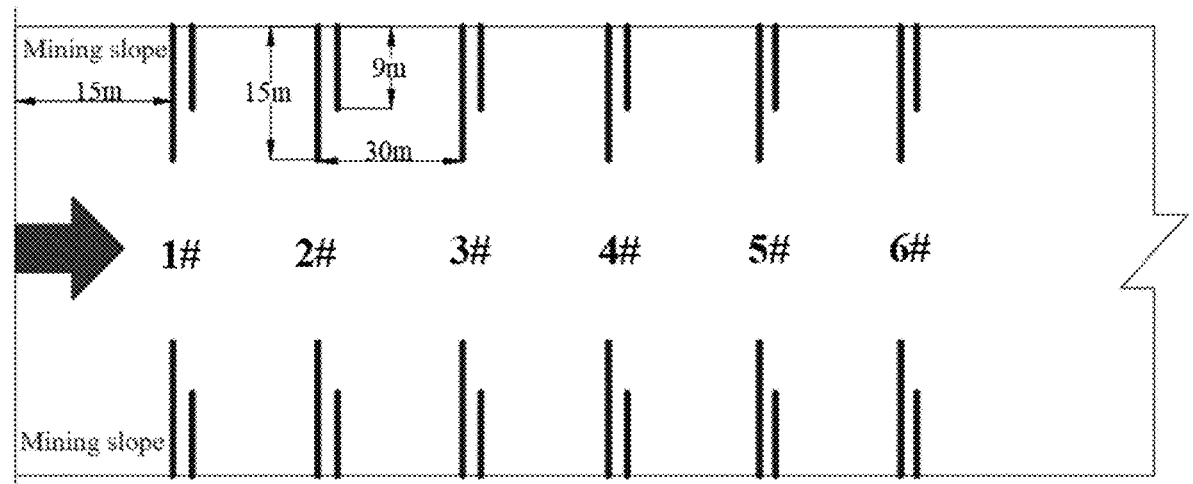
FIG. 2 illustrates a schematic diagram of a layout of an online stress monitoring system provided by the disclosure.

As shown in FIG. 2, the online stress monitoring system includes: multiple stress sensors, the stress sensors are arranged in groups of two, the two stress sensors in each group are arranged in combination with deep and shallow holes, multiple groups of stress sensors are arranged at equal intervals along a driving direction of a working face and disposed on mining slopes of two sides roadways of the working face, and the multiple groups of stress sensors are configured to obtain stress distributions of positions and feed them back to the data processing center. Among them, a monitoring range in front of the working face is not less than 300 m, a first group of measuring points (i.e., first group of stress sensors) is withdrawn when it is 15 m away from the working face, a distance between adjacent two monitoring points (adjacent two stress sensors) in the same group is not more than 2 m, a buried depth is 9 m for the shallow hole and a buried depth is 15 m for the deep hole, and a distance between adjacent two groups of stress sensors is 30 m, as shown in FIG. 2.

Figure 3:
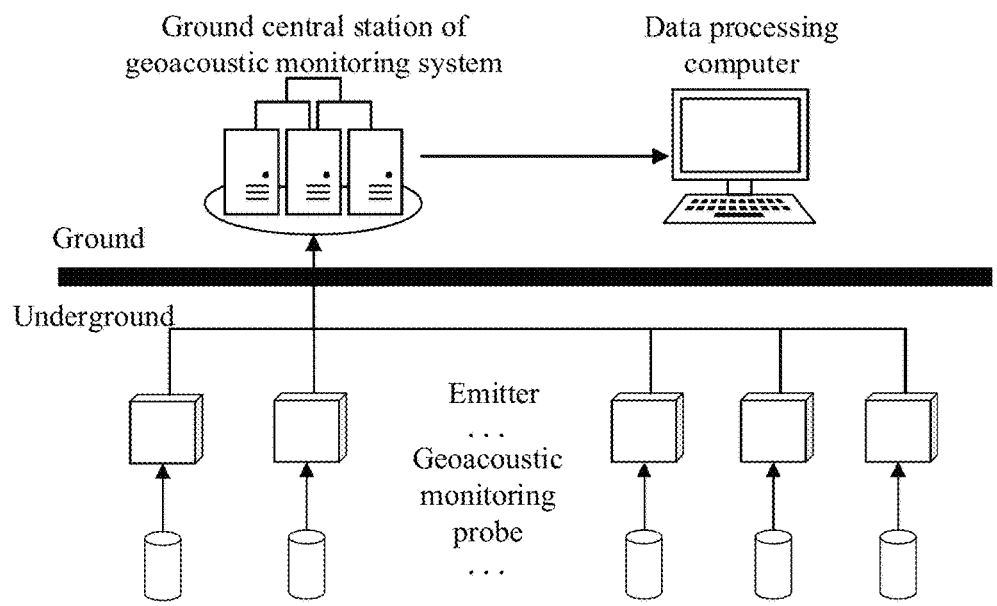
FIG. 3 illustrates a schematic diagram of a layout of a geoacoustic monitoring system provided by the disclosure.

As shown in FIG. 3, the geoacoustic monitoring system includes: a ground center and multiple geoacoustic monitoring probes, the ground center is arranged on the ground, and the geoacoustic monitoring probes are distributed on a mining face and a driving face underground for monitoring high-frequency vibration signals generated by the internal fracture of the coal and rock mass, and each geoacoustic monitoring probe feeds back the monitoring data to the ground center through a wireless data transmitter, and the ground center feeds back the monitoring data to the data processing center.

Figure 4:
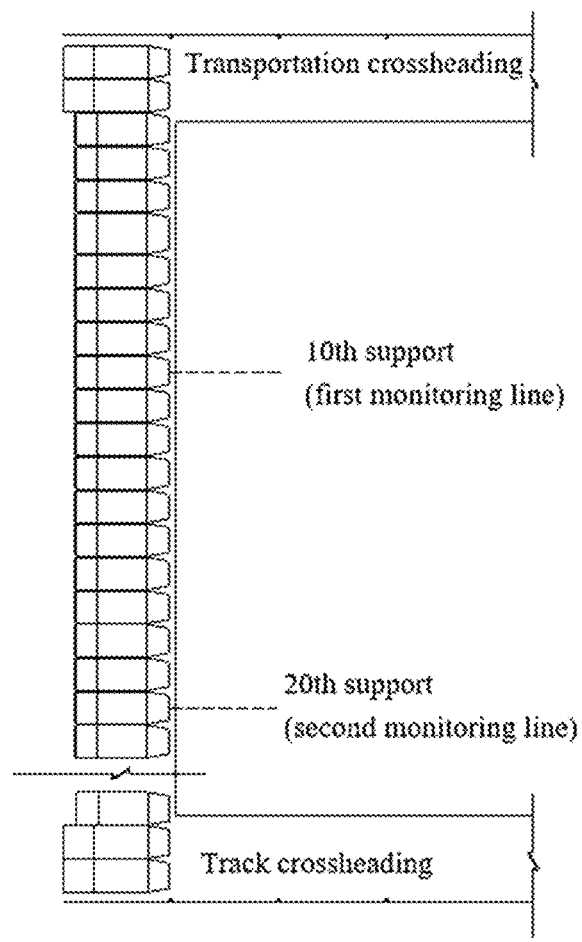
FIG. 4 illustrates a schematic diagram of a layout of a support resistance monitoring system provided by the disclosure.

As shown in FIG. 4, the support resistance monitoring system includes: a ground data processing device and multiple pressure self-recording instruments, the ground data processing device is arranged on the ground, and the pressure self-recording instruments are respectively installed on pillars of hydraulic supports in the coal mining face to monitor support pressures of the pillars and feed them back to the ground data processing device, and the ground data processing device takes an average support pressure of each hydraulic support as the support resistance of the hydraulic support.

Figure 5:
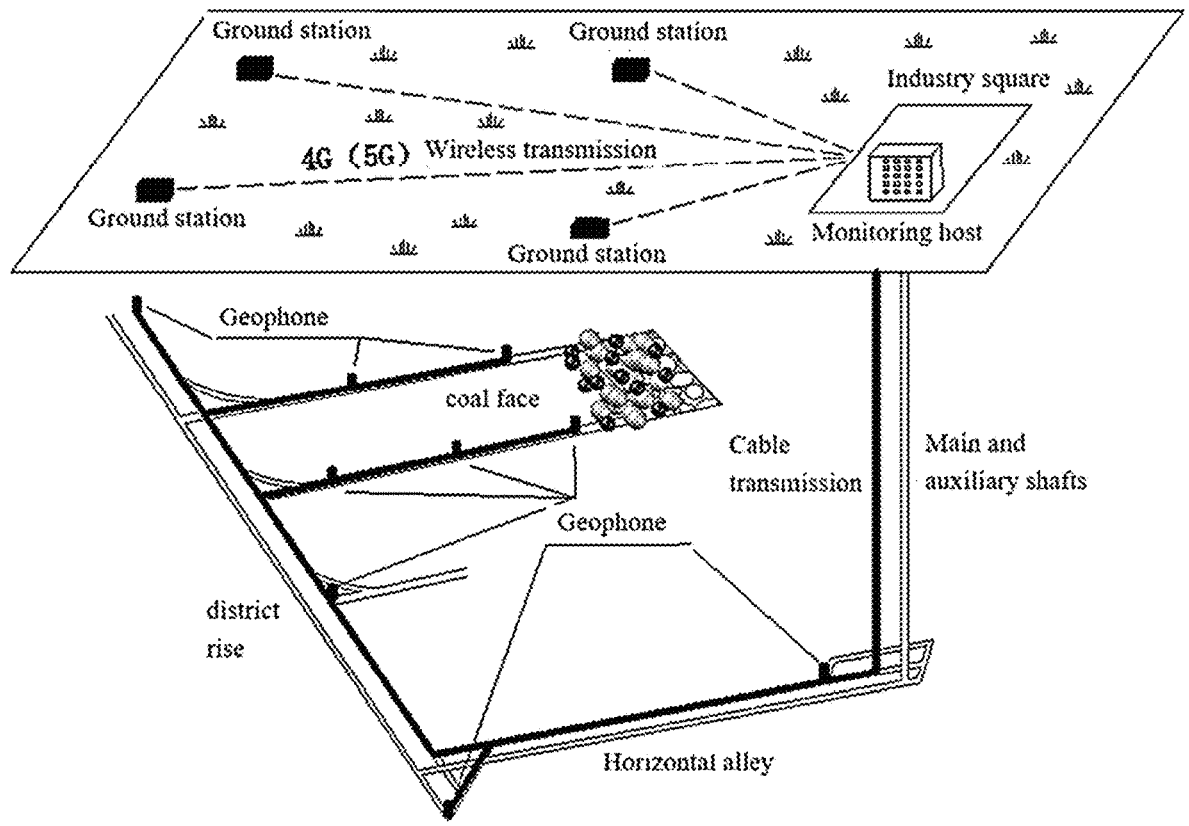
FIG. 5 illustrates a schematic diagram of a layout of a well-ground joint microseismic system provided by the disclosure.

As shown in FIG. 5, the well-ground joint microseismic system includes: ground devices and underground devices, and the ground devices are arranged on the ground of the mine and the underground devices are installed in the mine.

The ground devices include: a monitoring host and multiple ground stations, the ground stations are in data communication with the monitoring host and are used to receive control instructions sent by the monitoring host and collect data, and feed back the collected data to the monitoring host.

Figure 6:
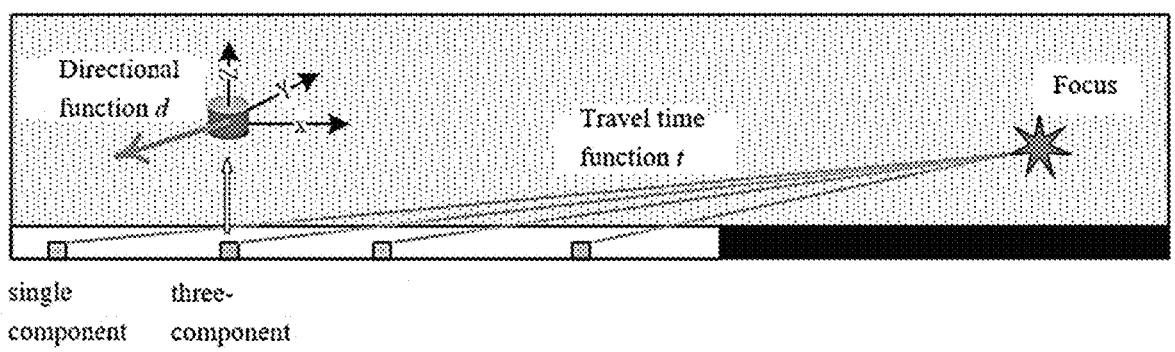
FIG. 6 illustrate a schematic diagram of constructing a mixed objective function for microseismic source positioning of the well-ground joint microseismic system of the disclosure.

As shown in FIG. 5 and FIG. 6, the underground devices include: multiple geophones, which are distributed on horizontal alleys in the mine, the district rises in the mining area and the air inlet and air return alleys in the coal mining face. The geophones include: a single-component geophone and/or a three-component geophone. Each geophone is connected with the monitoring host through a cable and used to feed back the collected waveform data (i.e., seismic data) to the monitoring host. The monitoring host is used to analyze and process the data fed back by each ground station and each geophone, perform the positioning of the microseismic source and the inversion imaging of mining fractures to obtain an imaging result, and feed back the imaging result to the data processing center.

Figure 7:
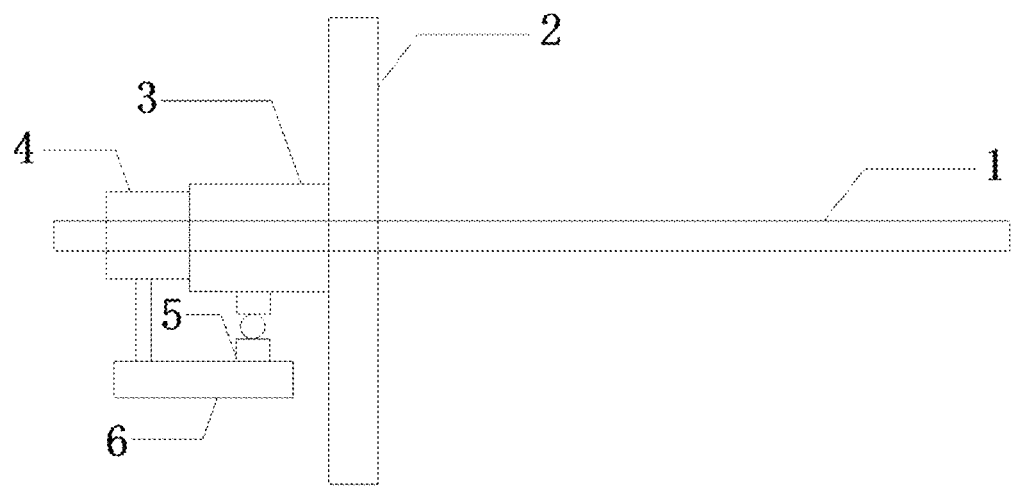
FIG. 7 illustrates a schematic diagram of a layout of an anchor stress monitoring system provided by the disclosure.
Figure 8:
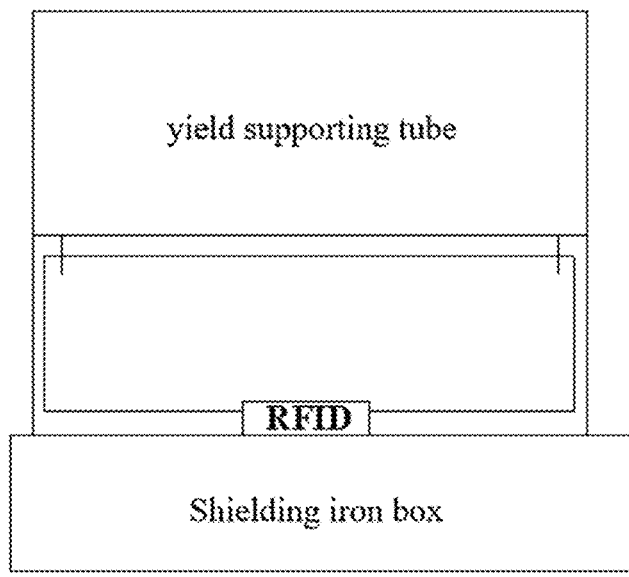
FIG. 8 illustrates a schematic diagram of a positional relationship between the RFID tag and the shielding iron box in the anchor stress monitoring system when the yield supporting tube is not deformed under stress.
Figure 9:
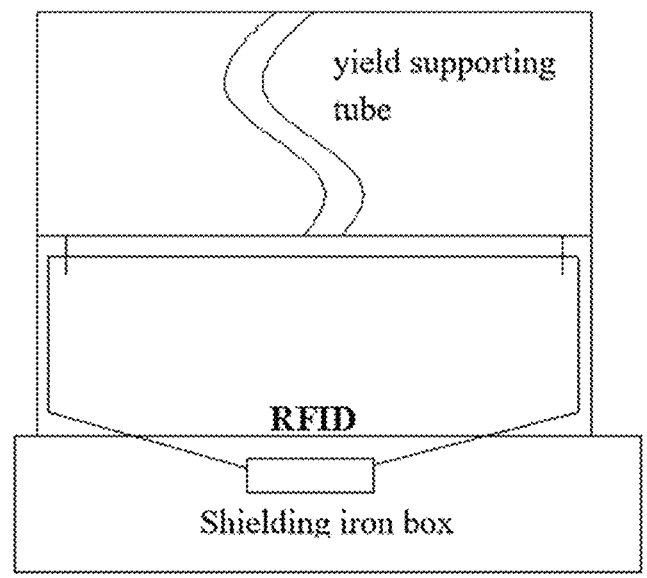
FIG. 9 illustrates a schematic diagram of a positional relationship between the RFID tag and the shielding iron box in the anchor stress monitoring system when the yield supporting tube is deformed under stress.

The anchor stress monitoring system includes: a yield supporting tube 3, three RFID tags 5 and a shielding iron box 6. A compressive strength of the yield supporting tube 3 is 30-50 MPa. The yield supporting tube 3 is sleeved on a rod body 1 outside the coal and rock mass and is tightly fixed between a tray 2 and a spherical nut 4, and the three RFID tags 5 are installed at the lower part of the yield supporting tube 3. In order to adapt to different arrangement angles of the anchor bolts and cables, the RFID tags 5 are flexibly connected with the yield supporting tube 3, the shielding iron box 6 and the spherical nut 4 are connected through a connecting rod, the shielding iron box 6 is disposed below the three RFID tags 5 and a top of the shielding iron box 6 defines an opening. As shown in FIG. 7, during normal monitoring, three RFID tags 5 can communicate with one another. As shown in FIGS. 8 and 9, when the yield supporting tube 3 is pressed and deformed, one of the RFID tags 5 enters the shielding iron box 6 through the opening, at this time, the shielding iron box 6 shields the communication of this RFID tag 5. According to the deformation of the yield supporting tube 3, the three RFID tags 5 can be controlled to enter the shielding iron box 6 in turn, and a stress cloud map is generated and fed back to the data processing center.

The data processing center summarizes the obtained monitoring data, and then comprehensively analyzes and processes the data by adopting an early warning model, so as to give early warning to the rock burst.

As shown in FIG. 1, a working method of the intelligent monitoring and early warning device for rock burst based on multi-field and multi-source information fusion of microseismic monitoring includes the following steps.

In the step 1, monitoring of the online stress monitoring system: after the online stress monitoring system is installed, each stress sensor collects stress distribution data of each position in real time during driving and mining of the working face, and feeds back the stress distribution data to the data processing center.

In the step 2: monitoring of the geoacoustic monitoring system: after the geoacoustic monitoring system is installed, multiple geoacoustic monitoring probes monitor high-frequency vibration signals generated by the internal fracture of the coal and rock mass at various positions during the driving and mining of the working face, and feed back the monitoring data to the ground center through wireless data transmitters, and the ground center feeds back the monitoring data to the data processing center.

In the step 3, monitoring and early warning of the support resistance monitoring system: after the support resistance monitoring system is installed, roof pressures in different areas of the working face are monitored by monitoring the support resistance of multiple hydraulic supports during the mining of the working face, and the ground data processing device feeds back the monitoring data to the data processing center through a wireless data transmitter.

In the step 4, monitoring of the well-ground joint microseismic system, includes: S1 to S4.

S1, according to an area to be monitored, an overall cooperative global optimal layout scheme of the ground stations and the geophones is established, and the ground stations and the geophones are arranged and installed according to the determined overall cooperative global optimal layout scheme. Among them, specific processes for establishing the overall cooperative global optimal layout scheme of the ground stations and the geophones include: S11 to S15.

S11, based on a mining geophysical method, a theoretical model describing a process from start to end of mining-induced microseismic source rupture is established; and a corresponding relationship between a microseismic energy and a signal main frequency and a corresponding relationship between the microseismic energy and a maximum amplitude are determined according to action mechanisms of different fracture scales and constitutive models in the coal and rock mass on microseismic source frequency changes and waveform amplitude changes.

S12, numerical simulation is used to study propagation and attenuation law of microseismic waveform signals with different main frequencies and maximum amplitudes in the surrounding rock of the roadway, to determine an effective monitoring range of microseismic signals with different energy levels under conventional environmental background noise, to establish a full-frequency signal acquisition scheme under different microseismic energy levels, and to obtain geophone types and effective installation ranges suitable for monitoring microseismic signals with different energy ranges.

S13, the adopted geophones include the single-component geophone and the three-component geophone. Firstly, a travel-time objective function t for positioning is constructed. By introducing a directional objective function d and combining the travel-time objective function t, a mixed objective function is constructed, which can reduce the arrival identification accuracy and the influence of network layout factors, and improve the solution accuracy of microseismic source parameters under unfavorable monitoring conditions. At this time, there is a high requirement for the spatial coverage of the microseismic monitoring network composed of the geophones. However, at present, the geophones cannot form a complete spatial coverage of the coal and rock mass in various monitoring scenes underground, resulting in the microseismic system being unable to accurately solve the position and parameters of the microseismic source. In order to break through this limitation, as shown in FIG. 6, a certain number of three-component geophones are used to monitor the propagation direction of microseismic vibration waves. Then, because the travel-time objective function t and the directional objective function d are closely related to the propagation path, a positioning objective function for three-dimensional wave velocity distributions under the curved ray path of the single-headed tunneling roadway is constructed to obtain the propagation path and angle closer to the actual microseismic signal in the roadway, so as to further eliminate the influence of wave velocity, ray propagation path and network layout on the microseismic positioning accuracy.

S14, production and construction processes, methods and environments of the rock burst in the mine are collected, and monitoring conditions of different working environments at different production stages are classified and analyzed, such as single-head monitoring, joint monitoring of the working face and a driving head, and joint monitoring between driving heads. According to different monitoring situations, a corresponding optimal geophone installation mode and reasonable installation parameters are determined, and a quantitative formula describing the difficulty of installation is constructed. According to the basic principle of underground geophone layout, considering the geophone types, spatial layouts and monitoring frequency bands, the optimal scheme of geophone layouts under different geological structure conditions and different roadway conditions is established. Then, the virtual arrival technology is used to simulate the arrival time of microseismic waveforms, and a multi-objective function is established to maximize the perception of tunneling microseismic signals, accurately solve microseismic source parameters and minimize the installation cost. Combined with the actual construction technology on site, a multi-objective function solution model based on particle swarm optimization algorithm is constructed, so as to finally determine the optimal spatial distribution of the geophones, including the numbers, types and positions of the geophones, and to establish the overall cooperative global optimal layout scheme between the ground stations and the geophones.

S15, in addition, in view of the situation that the monitoring quality is gradually declining due to the dynamic displacement of the geophones during the mining process, the dynamic alternating displacement method of the geophones is studied to realize the coordinated displacement of the microseismic monitoring system and the mining monitoring area as a whole. The single and three-component geophones are arranged at intervals behind the mining area for collaborative monitoring, so as to accurately pick up the arrival time and azimuth angle of the microseismic waveforms of the coal and rock mass in front. The minimum integrity magnitude index based on Gutenberg-Richter is used to judge the microseismic integrity of the coal and rock mass in the mining process in real time, and the critical condition of microseismic integrity of the dynamic displacement of the rear geophones is determined, and the comprehensive perception of microseismic activity of mining coal and rock mass is realized by alternately moving forward the geophones.

Figure 10:
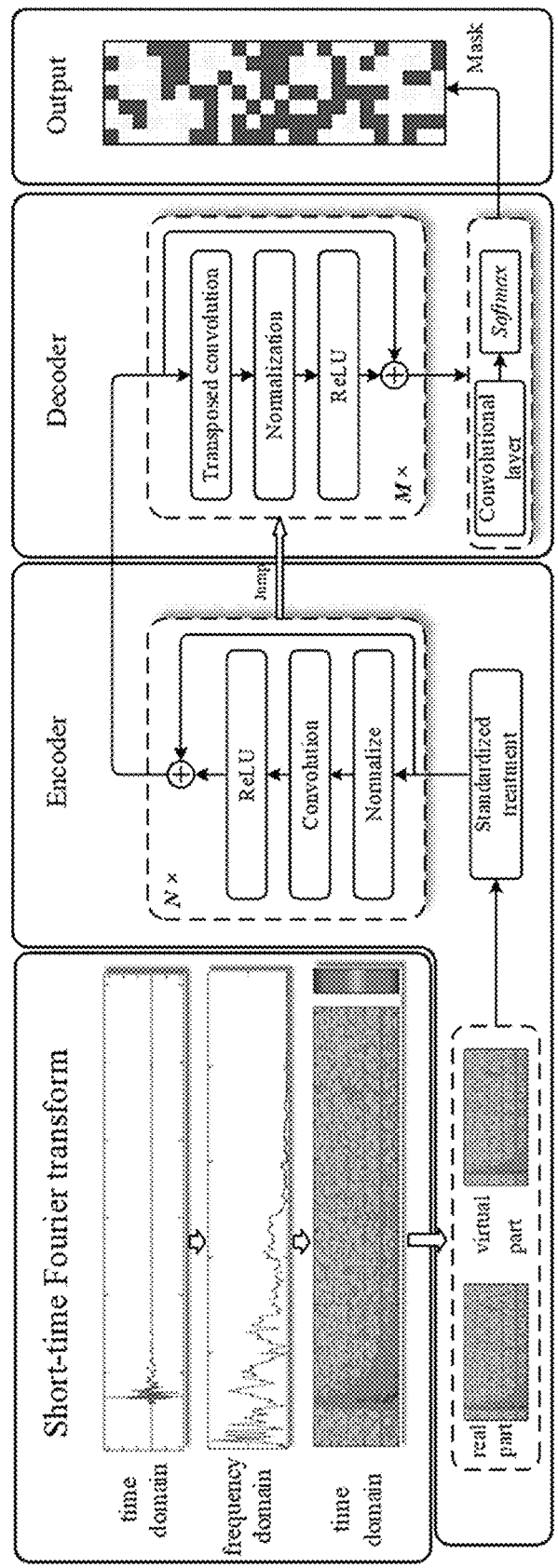
FIG. 10 illustrates a schematic diagram of a microseismic signal denoising model based on deep neural networks in the disclosure.

S2, in order to improve the signal-to-noise ratio (SNR) of microseismic signals, firstly, a microseismic signal denoising model based on deep neural network is constructed, which can learn features of the microseismic signals in a time domain and a frequency domain at the same time and map them into masks of the noise and original signal. The microseismic signals are input, and the model is used to output two masks for extracting original signal and noise. Based on the masks, the original signal and noise with high SNR can be extracted from the time-frequency image of the original signal. To denoise the collected seismic data, specific processes are as follows: as shown in FIG. 10, an initial microseismic signal denoising model is established, which includes three parts: frequency domain feature extraction, coding and decoding. Firstly, the input microseismic signal is transformed by short-time Fourier transform to obtain the time-frequency feature of the signal, the time-frequency feature is standardized to obtain the standardized time-frequency feature, the standardized time-frequency feature is input into the encoder for down-sampling, and a high-dimensional feature map is obtained through multiple down-sampling, and then the high-dimensional feature map is decoded through multiple up-sampling to obtain a mask m with the same size as the input time-frequency feature.

In this model, the input signals are microseismic signals $R(t)$ detected by various geophones, and the time-frequency feature $R(f,t)$ is obtained by short-time Fourier transform (STFT), which uses a time window with a length of 100 ms, and the process is expressed as follows:

$$R(f,t)=\text{STFT}[R(t)].$$

The time-frequency feature $R(f,t)$ includes: a microseismic signal $M(f,t)$ and noise $N(f,t)$, the time-frequency feature $R(f,t)$ is expressed as:

$$R(f,t)=M(f,t)+N(f,t).$$

The training goal of the model is to minimize the error between the predicted signal and the real signal, and the loss function is expressed as:

$$L(m,\hat{m})=\log(1+e^{-m\cdot\hat{m}}).$$

The generation method of the mask is as follows:

$$m = \left[1 + \left|\frac{N(f,t)}{M(f,t)}\right|\right]^{-1}.$$

Figure 11:
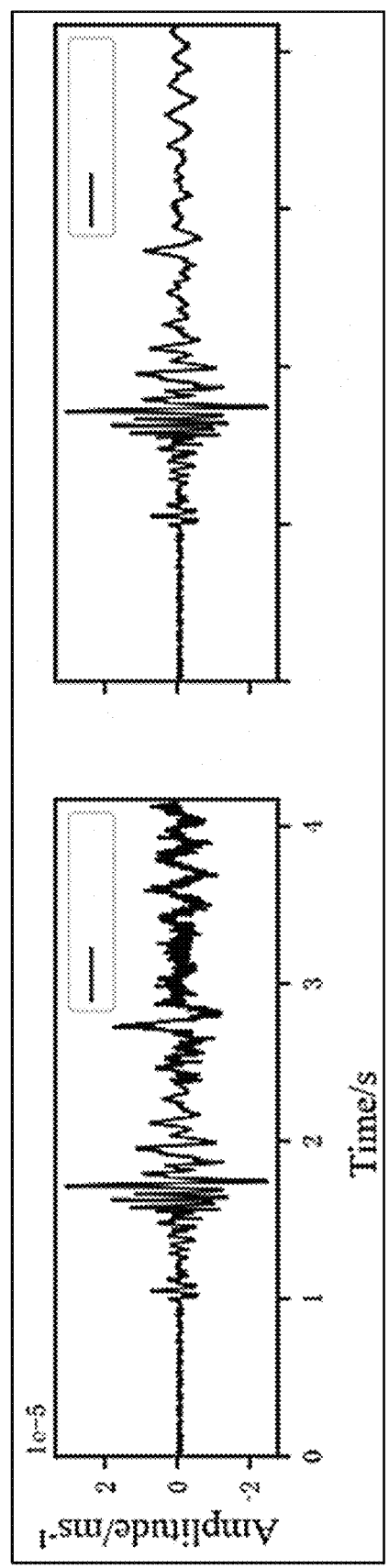
FIG. 11 illustrates a schematic diagram of microseismic signals before and after processing using the microseismic signal denoising model in the disclosure.

The initial microseismic signal denoising model is trained by using single-component microseismic waveforms of several coal mines, and the sampling rate of microseismic waveform data is 500 Hz and the length of microseismic waveform data is 6144. The data set includes more than 10,000 microseismic data with high SNR and more than 20,000 noise samples, which are randomly divided into the training set, the verification set and the test set at the ratio of 8:1:1. In each iteration, noise and microseismic signals are superimposed with the calculation to generate diverse microseismic signal data, and finally a training sample set of ten million signal levels can be generated. After training, the required microseismic signal denoising model is obtained by using this training sample set, and then the collected seismic data is denoised by using this denoising model, as shown in FIG. 11, and the denoised microseismic signals are obtained.

Figure 12:
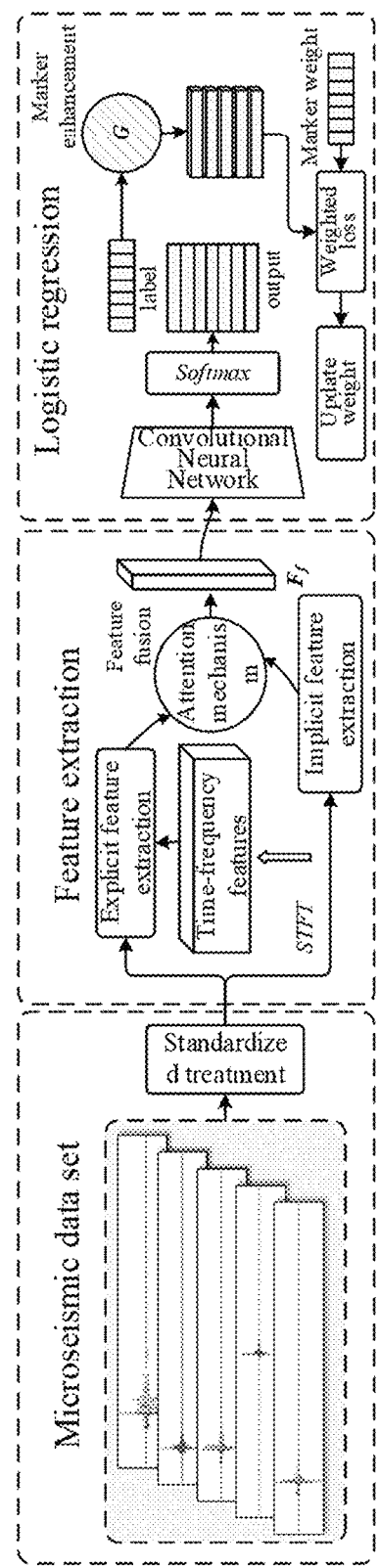
FIG. 12 illustrates a schematic diagram of constructing an automatic first arrival identification model for microseismic signals in the disclosure.

As shown in FIG. 12, an automatic first arrival identification model for microseismic signals in coal mines is constructed. When the intelligent monitoring and early warning device for rock burst based on multi-field and multi-source information fusion collects data, the monitoring host uses the established automatic first arrival identification model to extract the data fed back by each geophone, thus obtaining the microseismic signals. The specific processes of establishing the automatic first arrival identification model are as follows: based on the microseismic signal time-frequency conversion method of short-time Fourier transform, the microseismic spectrum map is constructed by taking advantages of the richer information features of microseismic signals in the frequency domain, and the features of microseismic signals are extracted from the time domain and the frequency domain; then, according to the implicit feature extraction method of microseismic data based on depth residual network and the explicit feature extraction method based on statistical method, a feature fusion method of complex microseismic data based on attention mechanism is established, so as to realize multi-level and multi-scale feature extraction, and finally the automatic first arrival identification model for microseismic signals in the coal mines is established.

In this embodiment, the input of this model is a microseismic signal with a length of 6144. Explicit feature extraction includes the following steps: frequency domain feature extraction is used by using short-time Fourier transform, the time-frequency image is transformed into a tensor of 3×256×256, and then a two-dimensional convolution kernel with a size of 4 is used to obtain a feature map of 96×13×13 through five convolution layers. Implicit feature extraction uses a feature extraction module including 10 convolution layers, in which the convolution kernel size is 1×7, and the feature map with the size of 1×128×14 can be obtained. The feature fusion module uses the self-attention mechanism to map the above two feature maps into feature vectors with the length of 1024, and the feature vectors are fused to obtain a feature map with the size of 1×1×1024. Then 3-layer transposed convolution and 2-layer 1×1 convolution are used to decode the features to output a tensor of 2×4×6144, and the Softmax operation is used on the first dimension of the data to obtain the probability curve corresponding to the mark. When calculating the loss, the weights of marks are 0.3, 0.3, 0.2 and 0.2 in turn.

Figure 13:
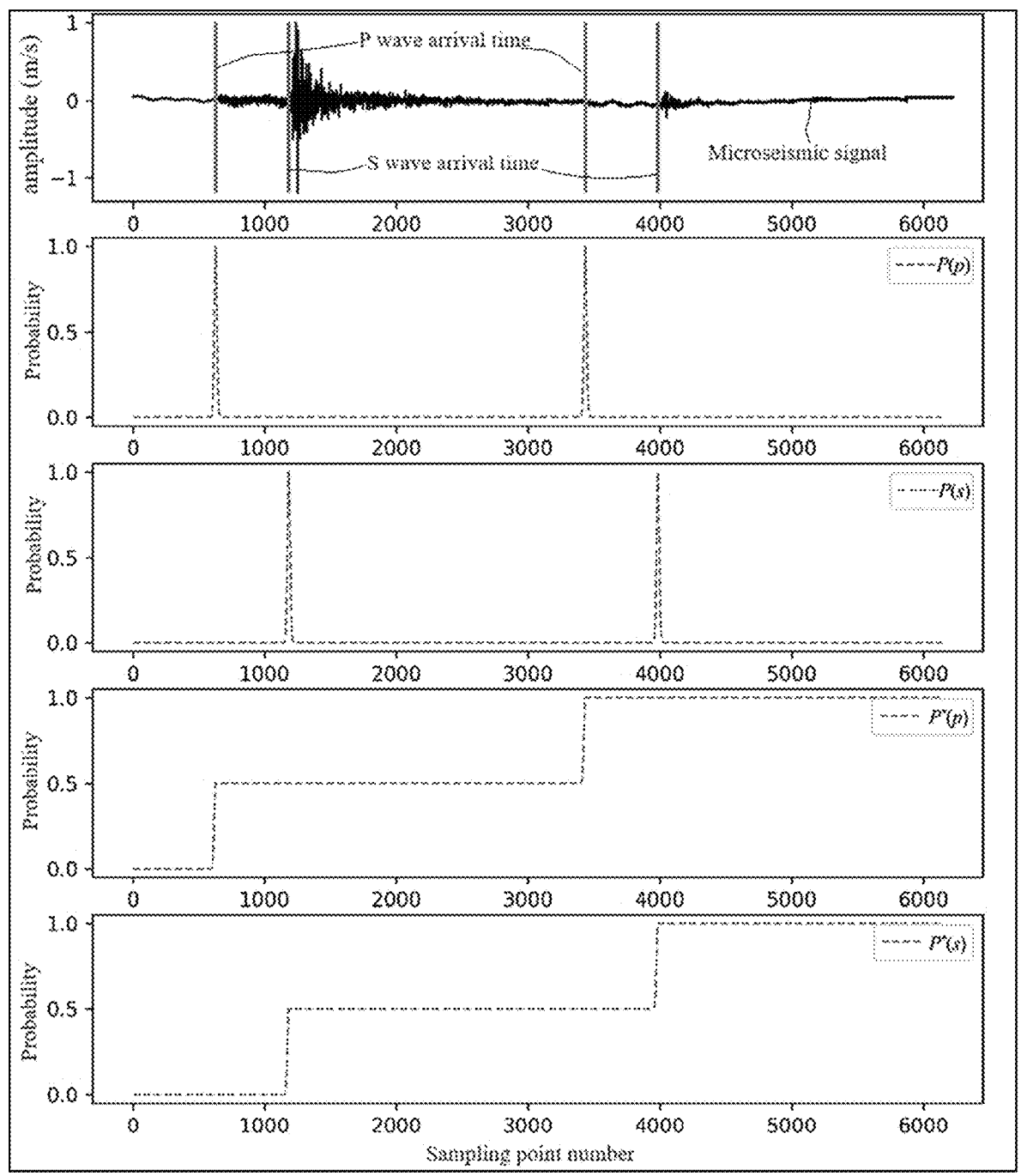
FIG. 13 illustrates a schematic diagram of multi-label processing of the microseismic signals in the automatic first arrival identification model of the disclosure.

As shown in FIG. 13, the method based on multi-label and label enhancement is to transform the original logical label $y_i$ of microseismic signals into label distribution, so as to fully mine the hidden information in the sample. The label enhancement method is expressed as:

$$P_i^*(h) = \frac{1}{n}\sum_{j=1}^{n}\frac{1}{1+\exp[-\alpha(x_i-\beta_j^h)]}$$

$$P_i(h) = \sum_{j=1}^{n}\frac{1}{\sqrt{2\pi}\sigma Z}\exp\left[-\frac{(x_i-\beta_j^h)^2}{2\sigma^2}\right].$$

In the above formulas, $x_i$ is the sample serial number; h represents the type of microseismic waves, namely P wave and S wave; $\beta_j^h$ represents the arrival time of the j-th wave with h type in the waveform; Z is the normalization factor; $\alpha$ is the soft label width coefficient and $\sigma$ is the standard deviation of Gaussian distribution, and the values of the above two parameters are respectively $\alpha=20$ and $\sigma=10/\sqrt{2\pi}$.

S3, according to the microseismic signals obtained in the S2 and the monitoring data obtained by the ground stations, the well-ground joint positioning is carried out, so as to obtain the positions of the microseismic source. Among them, the specific processes of the well-ground joint positioning are as follows.

S31, the microseismic signals and the monitoring data of ground stations are collected, and the position information of each geophone and each ground station is determined. For the position of the microseismic source in a horizontal direction, first the arrival time of the P wave of microseismic signals received by each geophone and each ground station is obtained, and the specific formula is as follows:

$$t_i - t_0 = \frac{\sqrt{(x_0-x_i)^2 + (y_0-y_i)^2 + (z_0-z_i)^2}}{v(x_0,y_0,z_0)}.$$

In the above formula: $x_0$, $y_0$, $z_0$ represent coordinates of the microseismic source; $t_0$ represents origin time of the microseismic source; $x_i$, $y_i$, $z_i$ represents coordinates of an i-th geophone or ground station; $t_i$ represents arrival time of the P wave at the i-th observation station (i.e., the i-th geophone or ground station); and $v(x_0, y_0, z_0)$ represents a propagation velocity of the P wave.

There are four unknowns ($x_0$, $y_0$, $z_0$, $t_0$) in the above formula, to solve this formula, data from at least four geophones or ground stations are needed. At present, the microseismic systems put into use in various mining areas are arranged in the form of 16 stations, so 16 formulas similar to the above formula can be listed, and the microseismic source positioning is to find the minimum value of the above formula. The above formula can be written as follows:

$$F(x_0,y_0,z_0,t_0) = \sum_{i=1}^{n} w_i \left| t_i - t_0 - \frac{\sqrt{(x_0-x_i)^2+(y_0-y_i)^2+(z_0-z_i)^2}}{v(x_0,y_0,z_0)} \right|^p.$$

In the above formula, $w_i$ represents a weight function of an observation value of the i-th geophone or ground station; n represents a number of geophones and ground stations marked by the P wave; and p represents a parameter with a value of 1 or 2.

The position information of the microseismic source in the horizontal direction is obtained by using the above formula calculation.

S32, for the position of the microseismic source in the vertical direction, the roadway level of the blasting position is determined by obtaining the mining engineering plan of the working face, and then the blasting construction account provided by the mining team is used to determine whether the microseismic source type is coal seam blasting or roof blasting. When it is the coal seam blasting, the vertical position (z value) of the blasting position is equal to the level of the roadway area where it is located (i.e., the roadway level); or when it is the roof blasting, the vertical position (z value) of the blasting position is equal to the level of the roadway area where it is located plus the explosive height shown in the construction layout of blasting and roof breaking.

S33, according to the influence of the distribution density and the height of underground strata, an initial wave velocity model is established. In practical engineering, the rock mass in the microseismic monitoring area is not uniform, and stress wave velocities in different areas are different. Therefore, the stress wave ray propagates according to the minimum travel time path, not the geometrically shortest path. In the microseismic monitoring of layered coal mines, the propagation of stress waves of the microseismic source to the ground stations in the mining area is more complicated than the propagation of stress waves of the microseismic source to the rock mass medium of the underground roadway, which leads to the great change of the P wave velocity in the vertical direction. Therefore, according to the drilling data of the current working face, the geological situation of the current working face is determined. As shown in Table 1, the strata are layered according to the thickness of the strata.

TABLE 1 thickness data of rock layers of working face

| Thickness (m) | Lithology | Initial wave velocity (m/s) |
| --- | --- | --- |
| 96.6 | Aeolian rock | 4500 |
| 253.3 | Fine grained sandstone | 4000 |
| 51.2 | Siltstone | 3700 |
| 32.1 | Medium grained sandstone | 3800 |
| 17.8 | Sandy mudstone | 2500 |
| 6.7 | 2-2 coal | 1000 |

Figure 14:
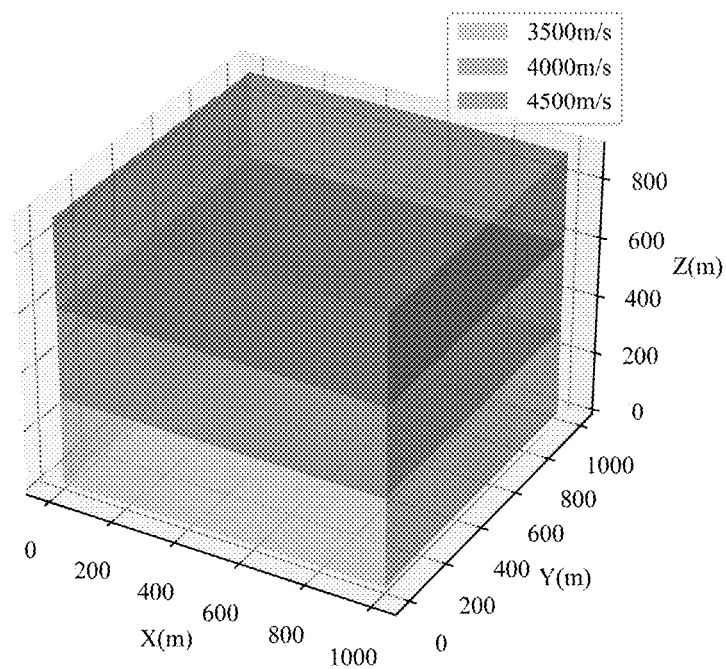
FIG. 14 illustrates a schematic diagram of an initial wave velocity model constructed in the disclosure.

According to the different lithologies and propagation velocities, the initial propagation velocity is first determined, and a three-dimensional layered velocity model is established by Python. The first layer interface of the three-dimensional layered velocity model is the ground surface, and the velocity in the three-dimensional layered velocity model increases gradually from top to bottom. The three-dimensional layered velocity model is divided into three velocity layers according to the similar velocity distributions, the three velocity layers are respectively numbered as ①, ② and ③ from bottom to top, and velocity values of the three velocity layers are denoted as V1, V2 and V3 respectively. Then, the upper boundary of each velocity layer is divided into grids to determine the propagation path of the seismic waves of microseismic events in the shortest time principle, and the wave velocity of each velocity layer is optimized by Powell optimization algorithm, as shown in FIG. 14, and the most reasonable initial wave velocity model is deduced.

The correctness and effectiveness of the inversion model are verified by calculating whether the sum of the residual between the calculated travel time of each microseismic event and the arrival time of the ground station is minimum. Specifically, taking the stress wave of the microseismic event in class ① wave velocity strata received by the geophone i as an example, the travel time relationship is derived as follows.

The spatial straight line passing through the seismic source and the geophone i can be expressed by parametric equations:

$$\begin{cases} x = (x_0 - x_i)k + x_i \\ y = (y_0 - y_i)k + y_i \\ z = (z_0 - z_i)k + z_i \end{cases}.$$

In the above formula, k is the linear parameter, $(x_0, y_0, z_0)$ represents blasting source coordinates, and $(x_i, y_i, z_i)$ represents coordinates of the ground station i.

Because the interfaces of class ① and class ② wave velocity rock masses, class ② and class ③ wave velocity rock masses and class ③ and class ④ wave velocity rock masses are parallel to each other, the general analytical expressions of their spatial planes are respectively expressed as:

$$\begin{cases} Ax + By + Cz + D_{1,2} = 0 \\ Ax + By + Cz + D_{2,3} = 0 \\ Ax + By + Cz + D_{3,4} = 0 \end{cases}.$$

As a result, the number of rock strata and the types of rock strata through which the stress wave of the same microseismic event propagates to each geophone are different. From the previous analogy, it can be obtained that the travel time $\Delta t_i$ of the stress wave of the microseismic event propagating to the geophone i can be expressed by the following formula:

$$\Delta t_i = \frac{\beta_i}{\alpha_i}\left( \frac{|Ax_0 + By_0 + Cz_0 + D_{i(1,2)}|}{V_{i1}} + \frac{|D_{i(1,2)} - D_{i(2,3)}|}{V_{i2}} + \dots + \frac{|D_{i(n-2,n-1)} - D_{i(n-1,n)}|}{V_{i(n-1)}} + \frac{|Ax_i + By_i + Cz_i + D_{i(n-1,n)}|}{V_{in}} \right).$$

Because the blasting event whose position can be determined is used for calculation, the optimal value of wave velocity $V_{in}$ of each layer in the formula can be calculated by powell algorithm.

Figure 15:
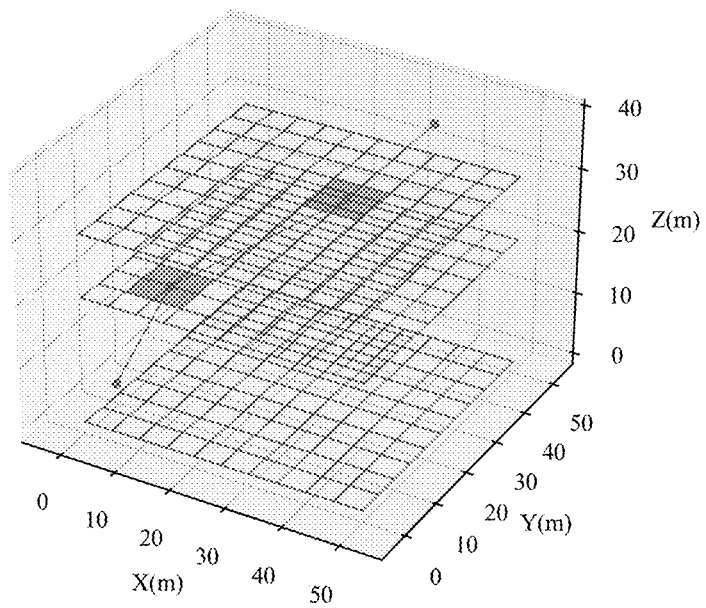
FIG. 15 illustrates a schematic diagram of mesh division of the wave velocity model in the disclosure.

S34, after the initial wave velocity model is constructed, the horizontal positioning result of the existing microseismic monitoring system in the mine is used as the initial positioning point of the microseismic source for the new non-located microseismic event, because the geophones of the microseismic monitoring system have good horizontal envelopment in the underground, there are a large number of ground stations and high positioning accuracy, the horizontal positioning result can be regarded as the real position of microseismic event. As shown in FIG. 15, the edge grid search and position is carried out on 100 points (an interval between two adjacent points is 1 m) above and below the initial positioning point of the microseismic source by using the waveform signals received by the ground stations and the initial wave velocity model obtained by inversion, and the point with the smallest time residual is regarded as the final position point of the microseismic source. The positioning formula is as follows:

$$f = \Sigma_{i,j=1}^{m} \xi_{i,j} = \Sigma_{i,j=1}^{m} [t_i - t_j - (\Delta t_i - \Delta t_j)]^2.$$

In the above formula, $t_i$ and $t_j$ represent arrival time of microseismic signals received by different ground stations, and $\Delta t_i$ and $\Delta t_j$ represent propagation time calculated by the points searched by the edge grid search and position according to a propagation path of the initial wave velocity model.

S4, according to the positions of the microseismic source obtained in the S3 and the microseismic signals obtained in the S2, a real-time inversion model of microseismic source rupture parameters is constructed, and the rupture parameters of the microseismic source are obtained after inversion according to the inversion model, and finally mining fracture imaging is formed according to the rupture parameters to obtain an imaging result, and the imaging result is fed back to the data processing center. The specific processes for S4 are as follows.

Figure 16:
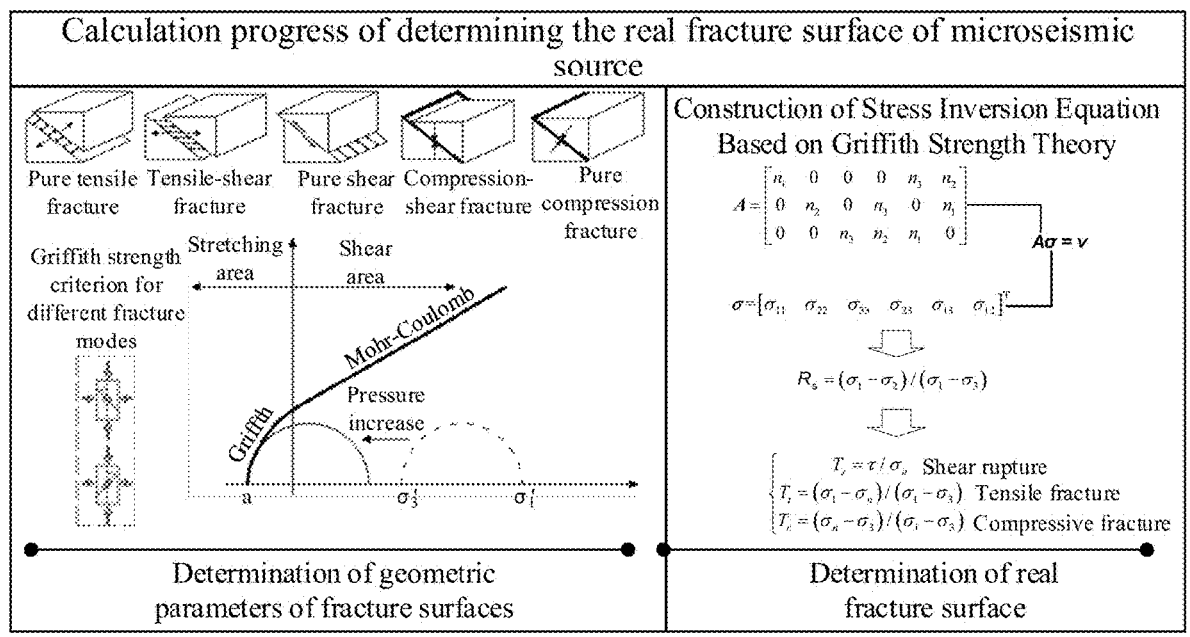
FIG. 16 illustrates a schematic diagram of a process of determining the real fracture surface of the microseismic source in the disclosure.

S41, as shown in FIG. 16, the microseismic waveforms induced during the mining of typical rock burst working face collected in the S2 (i.e., microseismic data collected in the S2) are taken as the basic data, the moment tensors are obtained by solving the focal mechanism of microseismic events with the mixed moment tensor method, and the parameters such as fracture types, azimuth angles, inclination angles, etc. are obtained after decomposing the moment tensors. However, limited by the symmetry of the moment tensor source models, there are two sets of parameters in the inversion moment tensor solution, that is, there are two fracture surfaces but there is only one real fracture surface, so it is necessary to determine the real fracture surface. When solving the real fracture surface, the mechanical geometric equations of stress tensors, normal components and slip components of fracture surfaces are constructed according to the focal source theory and Griffith strength theory of slip instability of fracture surface. An optimal function equation set for stress tensor solution is constructed by combining multiple microseismic source positions obtained in the S3, the optimal function equation set is solved by using particle swarm optimization or another algorithm to obtain the normalized proportional relationship of stress tensors of fracture surfaces, and the principal stress difference ratio is solved according to the proportional relationship. The fracture possibility indexes of two fracture surfaces are calculated, because the fracture is more likely to occur along the real fracture surface under the same stress conditions, and the one with the larger fracture possibility index is determined as the real fracture surface. According to the determined parameters of the real fracture surface and the positions of the microseismic source, a data set of the fracture mechanism of the microseismic source in the mine is established, which includes microseismic source positions, waveforms and focal mechanisms (fracture types, focal radius, azimuth and inclination angles) of the microseismic source.

S42, aiming at a complexity of identifying the focal mechanism of the microseismic source, the real-time inversion model of the microseismic focal rupture parameters is constructed based on migration learning. The real-time inversion model is trained by using the data set of the fracture mechanism of the microseismic source in the mine obtained in the S41 to obtain a trained real-time inversion model. The trained real-time inversion model is updated according to data collected by different coal mines to obtain an updated real-time inversion model. The model output layer is iteratively updated on the premise of fixing the common characteristic network layer to improve the inversion model for different coal mines. Finally, the original microseismic data is input into the real-time inversion model of microseismic source rupture parameters, and then the inversion model outputs the microseismic source rupture parameters (including fracture types, focal radius, azimuth angles, inclination angles and other parameters).

S43, after obtaining the real fracture surface and parameters (fracture types, focal radius, azimuth angles, inclination angles, etc.) determined by the real-time inversion, all fracture surfaces induced by microseisms can be imaged in space according to the spatial relationship of fracture surfaces. Under the same stress conditions, crack propagation should meet the principles of shortest path, one-way propagation and no repeated penetration, so the breadth-first search (BFS) method in graph theory is used to determine the penetration cracks between multiple intersecting fracture surfaces, and the fracture network is generated after the calculation is completed. The high-simulation geological model is combined with the fracture network to model, and the density and evolution trend of fracture development are directly projected into a three-dimensional space by using the fracture density mapping method and the time-space distance mapping method, so as to realize real-time imaging of mining fractures in the joint modeling of rock structure and focal mechanism, which provides a basis for studying the development law of mining fractures, the migration characteristics of stope rock structure, and the prediction and early warning of rock burst or strong mine earthquake.

In the step 5, monitoring of the anchor stress monitoring system: after the anchor stress monitoring system is installed on each anchor bolt and cable to be monitored, the RFID tags 5 are used to monitor the stress states of anchor bolts and cables in the roadway and generate stress nephogram, and the stress nephogram is fed back to the data processing center. Specifically:

I: Before monitoring, three thresholds are determined according to a relationship between deformations and stress values of a yield supporting tube 3. That is, a stress value corresponding to a deformation of the yield supporting tube 3 when the first RFID tag falls into a shielding iron box 6 is 65% of an anchoring force of the anchor bolt and cable, a stress value corresponding to a deformation of the yield supporting tube 3 when the second RFID tag falls into the shielding iron box 6 is 75% of the anchoring force of the anchor bolt and cable, and a stress value corresponding to a deformation of the yield supporting tube 3 when the third RFID tag falls into the shielding iron box 6 is 85% of the anchoring force of the anchor bolt and cable.

II: At the beginning of monitoring the stress state of anchor bolts and cables, the workers on duty every day patrol the roadway with a RFID reader, determine the stress states of the anchor bolts and cables by detecting whether the RFID fails, and record stress state levels of the anchor bolts and cables. The specific determination is as follows: for any anchor bolt and cable, when three RFID tags 5 can be detected, the stress state level of the anchor bolt and cable is determined to be a normal state; or when two RFID tags 5 can be detected, it is determined that the stress state level of the anchor bolt and cable is a low-risk stress state; or when one RFID tag 5 can be detected, it is determined that the stress state level of the anchor bolt and cable is a medium-risk stress state; or when the RFID tag 5 cannot be detected, it is determined that the stress state level of the anchor bolt and cable is a high-risk stress state.

III: After daily inspection, the workers on duty sort out the stress state level of each recorded anchor bolt and cable, draw the stress distribution nephogram of the surrounding rock of the roadway according to the stress state level of each anchor bolt and cable, and update it once every day, so as to obtain the change of stress distribution of the surrounding rock of the roadway and its latest stress distribution nephogram in time, and finally the latest stress distribution nephogram of the surrounding rock of the roadway is fed back to the data processing center.

In the step 6, an initial early warning model is established, and the trained early warning model is obtained after training the initial early warning model. Then, the monitoring data received by the data processing center in the above five steps are input into the early warning model. After comprehensive analysis of the early warning model, the prediction result of the rock burst is output and whether it is early warning is determined. Finally, the worker takes corresponding measures in time according to the prediction result to reduce the impact of the rock burst on the coal mine. The specific process is as follows.

Based on the massive historical data of the rock burst cloud platform, the initial early warning model is established, and then the energy level labels are generated according to the massive historical data of mines, expert knowledge and historical experience, thus forming data sets corresponding to the input and output of the early warning model. The initial early warning model is trained by the data set, and the trained early warning model is obtained. In each data set, 80% of the data is used for training, 10% of the data is used for verification and the remaining 10% of the data is used for evaluating the training effect of the constructed early warning model. In the actual deployment application, with the passage of time, the data will continue to accumulate and increase, and at least 30% of the data samples in the existing data set will be randomly selected to form a new small data set with the newly added data. The early warning model is fine-tuned and updated with the new data set by adopting the same method as the above training, thereby to adapt to small changes of spatial structure features and geological factors of the coal and rock mass.

Then, the monitoring data obtained from the step 1 to step 5 are used as the input data of the trained early warning model. For different input data, the trained early warning model maps it to the same feature space by convolution and cyclic neural network according to its dimension, and then uses the self-attention mechanism to realize the weighted fusion of various features, so as to obtain the fusion features that can represent the current state of the coal and rock mass in the framework. Then, the fusion features are input into the fully connected network for normalization, and a prediction result of the rock burst can be obtained after the normalization, the prediction result of the rock burst is one of four prediction results of the rock burst with different impact risk levels, namely no risk, weak risk, moderate risk or strong risk. And the early warning is carried out according to the prediction result.

The above is only the preferred embodiment of the disclosure, and it should be pointed out that for those skilled in the art, several improvements and embellishments can be made without departing from the principle of the disclosure, and these improvements and embellishments should also be regarded as the protection scope of the disclosure.

What is claimed is:

1. A work method of an intelligent monitoring and early warning device for rock burst based on multi-field and multi-source information fusion, comprising:

step 1, monitoring of an online stress monitoring system: after the online stress monitoring system is installed, collecting, by stress sensors, stress distribution data of positions in real time during driving and mining of a working face to obtain first monitoring data, and feeding back the first monitoring data to a data processing center;

step 2, monitoring and early warning of a geoacoustic monitoring system: after the geoacoustic monitoring system is installed, monitoring, by geoacoustic monitoring probes, high-frequency vibration signals generated by an internal fracture of a coal and rock mass at the positions during the driving and mining of the working face to obtain second monitoring data, and feeding back the second monitoring data to the data processing center through wireless data transmitters;

step 3, monitoring and early warning of a support resistance monitoring system: after the support resistance monitoring system is installed, monitoring roof pressures in different areas of the working face by monitoring support resistance of hydraulic supports during mining of the working face to obtain third monitoring data, and feeding back, by a ground data processing device, the third monitoring data to the data processing center through a wireless data transmitter;

step 4, monitoring of a well-ground joint microseismic system:

S1, establishing, according to an area to be monitored, an overall cooperative global optimal layout scheme of ground stations and geophones; and arranging and installing, according to the overall cooperative global optimal layout scheme, the ground stations and the geophones;

S2, constructing a microseismic signal denoising model based on deep neural network to denoise seismic data collected from the geophones to obtain denoised seismic data; constructing an automatic first arrival identification model for microseismic signals in a coal mine, and extracting, by a monitoring host, the denoised seismic data through using the automatic first arrival identification model to obtain the microseismic signals;

S3, performing, according to the microseismic signals obtained in the S2 and data obtained from the ground stations, well-ground joint positioning to obtain a position of a microseismic source; and S4, constructing, according to the position of the microseismic source obtained in the S3 and the microseismic signals obtained in the S2, a real-time inversion model of microseismic source rupture parameters; obtaining the microseismic source rupture parameters after inversion according to the real-time inversion model; and forming mining fracture imaging according to the microseismic source rupture parameters to obtain an imaging result; and feeding back the imaging result as fourth monitoring data to the data processing center;

step 5, monitoring and early warning of anchor stress monitoring systems: installing the anchor stress monitoring systems on anchor bolts and cables to be monitored, respectively; and using RFID tags to monitor stress states of the anchor bolts and cables in a roadway and generating stress nephogram; wherein the step 5 specifically comprises:

I: determining three thresholds according to a relationship between deformations and stress values of a yield supporting tube before monitoring; wherein a stress value corresponding to a deformation of the yield supporting tube when a first RFID tag of the RFID tags falls into a shielding iron box is 65% of an anchoring force of the anchor bolt and cable corresponding to the yield supporting tube, a stress value corresponding to a deformation of the yield supporting tube when a second RFID tag of the RFID tags falls into the shielding iron box is 75% of the anchoring force of the anchor bolt and cable corresponding to the yield supporting tube, and a stress value corresponding to a deformation of the yield supporting tube when a third RFID tag of the RFID tags falls into the shielding iron box is 85% of the anchoring force of the anchor bolt and cable corresponding to the yield supporting tube;

II: a worker on duty every day patrolling the roadway with a RFID reader when beginning to monitor the stress states of the anchor bolts and cables; and determining the stress states of the anchor bolts and cables by detecting whether the RFID reader fails, and recording stress state levels of the anchor bolts and cables; wherein specific progresses for determining the stress states of the anchor bolts and cables by detecting whether the RFID reader fails are as follows: for each anchor bolt and cable, a stress state level of the anchor bolt and cable is determined to be a normal stress state when three RFID tags are detected; or the stress state level of the anchor bolt and cable is determined to be a low-risk stress state when two RFID tags are detected; or the stress state level of the anchor bolt and cable is determined to be a medium-risk stress state when one RFID tag is detected; or the stress state level of the anchor bolt and cable is determined to be a high-risk stress state when no RFID tag is detected; and III: arranging the recorded stress state levels of the anchor bolts and cables after daily inspection by the worker on duty; drawing the stress nephogram of a surrounding rock of the roadway according to the recorded stress state levels of the anchor bolts and cables; and updating the stress nephogram after the daily inspection to obtain a change of stress distribution of the surrounding rock of the roadway and obtain latest stress nephogram of the surrounding rock of the roadway in time, and feeding back the latest stress nephogram of the surrounding rock of the roadway as fifth monitoring data to the data processing center;

step 6, constructing an initial early warning model, and training the initial early warning model to obtain an early warning model; inputting the first through fifth monitoring data received by the data processing center into the early warning model for comprehensive analysis, and then outputting a prediction result of the rock burst to determine whether to carry out early warning, thereby the worker taking corresponding measures in time according to the prediction result to reduce an impact of the rock burst on the coal mine.

2. The work method as claimed in claim 1, wherein in the well-ground joint microseismic system, the geophones are distributed in horizontal alleys in a mine, district rises in a mining area, and air inlet alleys and air return alleys in a coal mining face; and the geophones comprise a single-component geophone and/or a three-component geophone.

3. The work method as claimed in claim 1, wherein in each of the anchor stress monitoring systems, a compressive strength of the yield supporting tube is in a range of 30-50 MPa, the RFID tags are the three RFID tags, and each RFID tag is flexibly connected with the yield supporting tube.

4. The work method as claimed in claim 1, wherein specific progresses for establishing, according to the area to be monitored, the overall cooperative global optimal layout scheme of the ground stations and the geophones in the S1, comprise:

constructing, based on a mining geophysical method, a theoretical model describing a process from start to end of mining-induced microseismic source ruptures; and determining a corresponding relationship between a microseismic energy and a signal main frequency and a corresponding relationship between the microseismic energy and a maximum amplitude according to action mechanisms of different fracture scales and constitutive models on microseismic source frequency changes and waveform amplitude changes in the coal and rock mass;

using numerical simulation to study propagation and attenuation law of microseismic waveform signals with different main frequencies and maximum amplitudes in the surrounding rock of the roadway, determining an effective monitoring range of microseismic signals with different energy levels under conventional environmental background noise, determining a full-frequency signal acquisition scheme for the microseismic signals with different energy levels, and obtaining geophone types and effective installation ranges suitable for monitoring the microseismic signals with different energy levels;

constructing a travel-time objective function t for positioning, constructing a mixed objective function capable of reducing an arrival identification accuracy and an influence of network layout factors to improve a solution accuracy of microseismic source parameters under unfavorable monitoring conditions by introducing a directional objective function d and combining the travel-time objective function t; wherein the geophones comprise single-component geophones and three-component geophones; a positioning objective function for three-dimensional wave velocity distributions under a curved ray path of a single-headed tunneling roadway is constructed to obtain a propagation path and an angle closer to an actual microseismic signal of the single-headed tunneling roadway; and collecting production and construction processes, methods and environments of the rock burst in the mine; classifying and analyzing monitoring situations of different working environments in different production stages; determining a corresponding optimal geophone installation mode and installation parameters, and constructing a quantitative formula describing a difficulty of installation according to different monitoring situations; according to a basic principle of geophone layouts, considering the geophone types, spatial layouts and monitoring frequency bands, constructing an optimal scheme of the geophone layouts under different geological structure conditions and different roadway conditions; using a virtual arrival technology to simulate arrival time of microseismic waveforms, and constructing a multi-objective function to maximize perception of tunneling microseismic signals, accurately solve the microseismic source parameters and minimize installation costs; combined with an actual construction technology on site, constructing a multi-objective function solution model based on particle swarm optimization algorithm to determine an optimal spatial distribution of the geophones and establish the overall cooperative global optimal layout scheme of the ground stations and the geophones.

5. The work method as claimed in claim 1, wherein specific progresses for constructing the microseismic signal denoising model based on deep neural network in the S2, comprise: constructing an initial microseismic signal denoising model which includes three parts: frequency domain feature extraction, coding and decoding;
   wherein specific progresses for constructing the initial microseismic signal denoising model, comprise:
      performing short-time Fourier transform (STFT) on an input microseismic signal to obtain a time-frequency feature;
      performing standardization on the time-frequency feature to obtain a standardized time-frequency feature, inputting the standardized time-frequency feature into an encoder for down-sampling, and obtaining a high-dimensional feature map through multiple down-sampling; and
      decoding the high-dimensional feature map through multiple up-sampling to obtain a mask m with a size of the mask being the same as a size of the standardized time-frequency feature;
   wherein input signals of the initial microseismic signal denoising model are input microseismic signals R(t) detected by the geophones, time-frequency feature R(f, t) is obtained by the STFT of the input microseismic signals R(t), the STFT uses a time window with a length of 100 ms, and a progress for obtaining the time-frequency feature R(f,t) is expressed as follows:

$R(f,t)=STFT[R(t)]$;

wherein the time-frequency feature R(f,t) comprises: a microseismic signal M(f,t) and noise N(f,t), and the time-frequency feature R(f,t) is expressed as follows:

$R(f,t)=M(f,t)+N(f,t)$;

wherein a training goal of the initial microseismic signal denoising model is to minimize an error between a predicted signal and a real signal, and a loss function is expressed as follows:

$L(m,\hat{m})=\log(1+e^{-m\cdot\hat{m}})$;

wherein a generation method of the mask m is as follows:

$$m = \left[1 + \left|\frac{N(f, t)}{M(f, t)}\right|\right]^{-1};$$

and
   wherein the initial microseismic signal denoising model uses single-component microseismic waveforms of multiple coal mines for training to obtain the microseismic signal denoising model.

6. The work method as claimed in claim 1, wherein specific progresses for constructing the automatic first arrival identification model in the S2, comprise:
   constructing, based on a microseismic signal time-frequency conversion method of short-time Fourier transform, a microseismic spectrum map based on the microseismic signals in a frequency domain and extracting microseismic signal features from a time domain and the frequency domain; based on an implicit feature extraction method of microseismic data based on deep residual network and an explicit feature extraction method based on statistical method, constructing a feature fusion method of complex microseismic data based on attention mechanism; and constructing the automatic first arrival identification model for the microseismic signals in the coal mine.

7. The work method as claimed in claim 1, wherein specific progresses for performing the well-ground joint positioning in the S3, comprise:
   collecting the microseismic signals and the data obtained from the ground stations, and determining position information of the geophones and the ground stations; for microseismic source positioning in a horizontal direction, obtaining arrival time of a P wave of the microseismic signals received by each geophone and each ground station; wherein a first formula is as follows:

$$t_i - t_0 = \frac{\sqrt{(x_0 - x_i)^2 + (y_0 - y_i)^2 + (z_0 - z_i)^2}}{v(x_0, y_0, z_0)};$$

wherein $x_0$, $y_0$, $z_0$ represents coordinates of the microseismic source; $t_0$ represents origin time of the microseismic source; $x_i$, $y_i$, $z_i$ represents coordinates of an i-th geophone or ground station; $t_i$ represents arrival time of the P wave at the i-th geophone or ground station; and $v(x_0, y_0, z_0)$ represents a propagation velocity of the P wave;
   wherein there are four unknowns ($x_0$, $y_0$, $z_0$, $t_0$) in the first formula, and the microseismic source positioning in the horizontal direction is to find a minimum value of the first formula, and the first formula is written a second formula as follows:

$$F(x_0, y_0, z_0, t_0) = \sum_{i=1}^{n} w_i \left| t_i - t_0 - \frac{\sqrt{(x_0 - x_i)^2 + (y_0 - y_i)^2 + (z_0 - z_i)^2}}{v(x_0, y_0, z_0)} \right|^p;$$

wherein $w_i$ represents a weight function of an observation value of the i-th geophone or ground station; n represents a number of geophones and ground stations marked by the P wave; and p represents a parameter with a value of 1 or 2;
   obtaining position information of the microseismic source in the horizontal direction by using the second formula for calculation;
   for microseismic source positioning in a vertical direction, determining a roadway level of a blasting position by obtaining a mining engineering plan of the working face, and determining whether a type of the microseismic source is coal seam blasting or roof blasting by using a blasting construction account provided by a mining team; wherein a vertical position of the blasting position is equal to the roadway level when the type of the microseismic source is the coal seam blasting; or a vertical position of the blasting position is equal to the roadway level plus a height of explosives shown in a layout plan for blasting and roof breaking construction when the type of the microseismic source is the roof blasting;

constructing an initial wave velocity model according to an influence of a distribution density and a height of underground strata; wherein specific progresses for constructing the initial wave velocity model comprise: determining a geological situation of the working face according to drilling data of the working face, and layering strata according to a thickness of the strata; determining an initial propagation velocity according to different lithologies and propagation velocities of the strata, and constructing a three-dimensional layered velocity model; wherein a first layer interface of the three-dimensional layered velocity model represents a ground surface, and a velocity gradually increases from top to bottom; and the three-dimensional layered velocity model is divided according to similar velocity distributions to obtain three velocity layers; an upper boundary of each velocity layer is divided into grids to determine a propagation path of seismic waves of microseismic events in a shortest time principle, and a Powell optimization algorithm is used to optimize a wave velocity of each velocity layer, and the initial wave velocity model is obtained; and after the initial wave velocity model is constructed, for a non-positioned microseismic event, taking a horizontal positioning result of an existing microseismic monitoring system in the mine as an initial positioning point of the microseismic source, and then performing edge grid search and position on 100 points above and below the initial positioning point of the microseismic source by using waveform signals received by the ground stations and the initial wave velocity model; and taking a point with a smallest time residual as a final positioning point of the microseismic source; wherein a positioning formula is as follows:

$$f = \sum_{i,j=1}^{m} \xi_{i,j} = \sum_{i,j=1}^{m} [t_i - t_j - (\Delta t_i - \Delta t_j)]^2$$

where $t_i$ and $t_j$ represent arrival time of microseismic signals received by different ground stations; $\Delta t_i$ and $\Delta t_j$ represent propagation time calculated by points searched by the edge grid search and position according to a propagation path of the initial wave velocity model.

8. The work method as claimed in claim 1, wherein the S4 comprises:

S41, taking the microseismic signals obtained in the S2 as basic data and using a mixed moment tensor method to solve a focal mechanism of microseismic events to obtain moment tensors, and decomposing the moment tensors to obtain parameters of fracture surfaces of the microseismic source; wherein due to a symmetry limitation of moment tensor focal models, there are two sets of parameters in inverse moment tensor solutions, a real fracture surface is determined for subsequent analysis; when determining the real fracture surface, mechanical geometric equations of stress tensors, normal components and slip components of fracture surface microelements are constructed according to a microseismic source theory and a Griffith strength theory of fracture surface slip instability, the position of the microseismic source obtained in the S3 are combined to construct an optimal function equation set for stress tensor solution, the optimal function equation set is solved by using particle swarm optimization to obtain a normalized proportional relationship of the stress tensors of the fracture surfaces, a principal stress difference ratio is solved according to the normalized proportional relationship, and fracture possibility indexes of the two fracture surfaces are calculated; because a fracture is more likely to occur along the real fracture surface under same stress conditions, one of the two fracture surfaces with a larger fracture possibility index is determined as the real fracture surface; and a data set of a fracture mechanism of the microseismic source in the mine is established according to determined parameters of the real fracture surface and the position of the microseismic source;

S42, aiming at a complexity of identifying the focal mechanism, constructing the real-time inversion model of the microseismic focal rupture parameters based on migration learning, and training the real-time inversion model by using the data set of the fracture mechanism of the microseismic source in the mine obtained in the S41 to obtain a trained real-time inversion model, and updating the trained real-time inversion model according to data collected by different coal mines to obtain an updated real-time inversion model; wherein a model output layer is iteratively updated on the premise of fixing a common feature network layer to improve inversion models for the different coal mines; and original microseismic data is input to the updated real-time inversion model to obtain the microseismic source rupture parameters; and S43, after obtaining the real fracture surface and the microseismic source rupture parameters, combined with microseismic source spatialization, imaging fracture surfaces induced by microseisms in space according to spatial relationships of the fracture surfaces; wherein under the same stress conditions, crack propagation meets principles of shortest path, one-way propagation and no repeated penetration, a breadth-first search (BFS) method in graph theory is used to determine penetration cracks between multiple intersecting fracture surfaces and generate a fracture network; a high-simulation geological model is constructed and combined with the fracture network, and density and evolution trend of fracture development are directly projected into a three-dimensional space by using a fracture density mapping method and a time-space distance mapping method, and the imaging result is fed back to the data processing center.

9. The work method as claimed in claim 1, wherein the step 6 comprises:

constructing the initial early warning model based on massive historical data of a rock burst cloud platform, generating energy grade labels according to massive historical data of mines, expert knowledge and historical experience to obtain a data set corresponding to input and output of the initial early warning model, training the initial early warning model with the data set to obtain the early warning model, and using the first to fifth monitoring data obtained from the step 1 to 5 as input data of the early warning model to obtain the prediction result of the rock burst; wherein the early warning model maps the input data to a feature space according to a dimension by convolution and cyclic neural network, and then uses a self-attention mechanism to realize a weighted fusion of features, and obtains fusion features representing a current state of the coal and rock mass in a framework, the fusion features are input into a fully connected network for normalization to obtain the prediction result of the rock burst, the prediction result of the rock burst is no risk, weak risk, moderate risk or strong risk, and the early warning is carried out according to the prediction result.

10. The work method as claimed in claim 9, wherein 80% data in the data set is used to train the initial early warning model, 10% data in the data set is used for verification, and the remaining 10% data in the data set is used to evaluate a training effect of the constructed early warning model; newly added data continues to increase with passage of time in an actual early warning process, and at least 30% of the data in the data set is randomly selected to form an updated data set with the newly added data; and the early warning model is fine-tuned by using the updated data set for training.

\* \* \* \* \*